US011218777B2

(12) United States Patent
Liu

(10) Patent No.: US 11,218,777 B2
(45) Date of Patent: Jan. 4, 2022

(54) METHOD, DEVICE AND SYSTEM FOR PROCESSING BULLET SCREEN

(71) Applicant: BOE Technology Group Co., Ltd., Beijing (CN)

(72) Inventor: Zijun Liu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 152 days.

(21) Appl. No.: 16/438,606

(22) Filed: Jun. 12, 2019

(65) Prior Publication Data

US 2020/0099988 A1    Mar. 26, 2020

(30) Foreign Application Priority Data

Sep. 20, 2018   (CN) .......................... 201811102164.X

(51) Int. Cl.
| | |
|---|---|
| *H04N 21/488* | (2011.01) |
| *H04N 21/25* | (2011.01) |
| *H04N 21/431* | (2011.01) |
| *H04N 21/442* | (2011.01) |

(52) U.S. Cl.
CPC ....... *H04N 21/4882* (2013.01); *H04N 21/252* (2013.01); *H04N 21/4316* (2013.01); *H04N 21/44204* (2013.01); *H04N 21/44213* (2013.01)

(58) Field of Classification Search
CPC ....... H04N 21/42204; H04N 21/42224; H04N 21/4532; H04N 21/25891; H04N 21/482; H04N 21/4126; H04N 21/4751; H04N 21/6582
See application file for complete search history.

(56) References Cited

U.S. PATENT DOCUMENTS

| 10,136,188 B1* | 11/2018 | Nijim ............... H04N 21/23109 |
| 2005/0275758 A1* | 12/2005 | McEvilly ........... H04N 21/6581 |
| | | 348/725 |
| 2006/0048184 A1* | 3/2006 | Poslinski ............... H04N 7/163 |
| | | 725/45 |
| 2007/0294249 A1* | 12/2007 | Feyaerts ............ H04N 21/4668 |
| 2009/0100147 A1* | 4/2009 | Igarashi ............ H04N 21/6408 |
| | | 709/218 |
| 2018/0190253 A1 | 7/2018 | O'Driscoll et al. |

FOREIGN PATENT DOCUMENTS

| CN | 203102801 U | 7/2013 |
| CN | 105872593 A | 8/2016 |
| CN | 108235081 A | 6/2018 |

OTHER PUBLICATIONS

First office action of Chinese application No. 201811102164.X dated Jun. 10, 2020.

* cited by examiner

*Primary Examiner* — Jason Salce
(74) *Attorney, Agent, or Firm* — Fay Sharpe LLP

(57) ABSTRACT

A method for processing bullet screen, comprising: acquiring bullet screen information and tag information of an account of a user watching a target multimedia content, the bullet screen information including a bullet screen content, and the tag information being configured to identify a type of the account; and determining, based on a matching result between the tag information and the bullet screen information, whether to display the bullet screen content in the bullet screen information while displaying the target multimedia content.

18 Claims, 10 Drawing Sheets

METHOD, DEVICE AND SYSTEM FOR PROCESSING BULLET SCREEN

CROSS-REFERENCE TO RELATED APPLICATION

This application claims priority to Chinese Patent Application No. 201811102164.X, filed on Sep. 20, 2018 and entitled "Method, Device and System for Processing Bullet Screen", the entire contents of which are incorporated herein by in its entirety.

TECHNICAL FIELD

The present disclosure relates to a method, device and system for processing bullet screen.

BACKGROUND

Nowadays, more and more applications support users to send bullet screen information that includes a bullet screen content (abbreviated as bullet screen) while watching a multimedia content. The multimedia content may be a picture, an audio or a video, and the bullet screen refers to commentary subtitles that are sent by the users about the multimedia content through a terminal and displayed on the multimedia content played at the terminal. The bullet screen enables different users to make comments on the multimedia content across time and space boundaries.

SUMMARY

Embodiments of the present disclosure relates to method, device and system for processing bullet screen. The technical solutions are as follows.

According to a first aspect of embodiments of the present disclosure, there is provided a method for processing bullet screen. The method comprises:

acquiring bullet screen information and tag information of an account of a user watching a target multimedia content, the bullet screen information including a bullet screen content, and the tag information being configured to identify a type of the account; and determining, based on a matching result between the tag information and the bullet screen information, whether to display the bullet screen content in the bullet screen information while displaying the target multimedia content.

Optionally, wherein acquiring the bullet screen information and the tag information of the account of the user watching the target multimedia content comprises:

receiving the bullet screen information sent by a client on which a first account logs, the first account being an account of a user currently watching the target multimedia content;

determining first tag information of the first account; and acquiring second tag information of a second account of the user currently watching the target multimedia content;

wherein determining, based on the matching result between the tag information and the bullet screen information, whether to display the bullet screen content in the bullet screen information while displaying the target multimedia content comprises:

filtering a target account from the second account, the second tag information of the target account matching with the first tag information; and sending the bullet screen content in the bullet screen information to the client on which the target account logs, the client on which the target account logs being configured to display the bullet screen content while displaying the target multimedia content.

Optionally, wherein filtering the target account from the second account comprises:

determining, in the second tag information of the second account, candidate tag information matching with the first tag information; and filtering the target account from a candidate account, the candidate account being an account to which the candidate tag information belongs.

Optionally, wherein filtering the target account from the candidate account comprises:

extracting keywords from the bullet screen content in the acquired bullet screen information;

determining a related multimedia content of the target multimedia content, the related multimedia content being a multimedia content related to at least one of attributes and keywords of the target multimedia content;

determining, in the related multimedia content, a candidate multimedia content related to the extracted keywords;

determining third tag information corresponding to the candidate multimedia content; determining, in the tag information of the candidate account, the tag information matching with the third tag information; and determining the candidate account to which the matched tag information belongs as the target account.

Optionally, wherein filtering the target account from the candidate account comprises:

determining a second tag level of the candidate tag information of the candidate account to which the candidate tag information belongs;

filtering the target account from the candidate account based on a first tag level and the second tag level; wherein the target account satisfies any one of the followings:

the second tag level of the target account is higher than the first tag level;

the second tag level of the target account is lower than the first tag level;

the second tag level of the target account is equal to a specified tag level, wherein, the first tag level being a tag level of the first tag information of the first account.

That is, determining the candidate account having a second tag level higher than the first tag level is correspondingly determined as the target account; or, determining the candidate account having a second tag level lower than the first tag level is correspondingly determined as the target account; or determining the candidate account having a second tag level equal to the specified tag level is correspondingly determined as the target account.

Optionally, wherein determining the first tag information of the first account comprises any one of:

carrying the first tag information in each piece of the bullet screen information posted by the first account, and extracting the first tag information from any piece of the bullet screen information posted by the first account;

querying correspondence between the account and the tag information based on the first account, and acquiring the first tag information of the first account;

acquiring historical behaviors corresponding to the first account, and determining the first tag information based on the historical behaviors; and acquiring user attribute information corresponding to the first account, and determining the first tag information based on the user attribute information.

Optionally, the multimedia content is one of a picture, an audio and a video, and the bullet screen information further includes an account and a content related to the account.

Optionally, wherein acquiring the bullet screen information and the tag information of the account of the user watching the target multimedia content comprises:

acquiring the bullet screen information posted for the target multimedia content; and determining the first tag information of the first account, the first account being the account of the user currently watching the target multimedia content;

wherein determining, based on the matching result between the tag information and the bullet screen information, whether to display the bullet screen content in the bullet screen information while displaying the target multimedia content comprises:

acquiring second tag information of the second account from which each piece of the bullet screen information is derived;

filtering a target account from the second account, the second tag information of the target account matching with the first tag information; and sending the bullet screen content in the bullet screen information derived from the target account to the client on which the first account logs, the client on which the first account logs being configured to display the bullet screen content while displaying the target multimedia content.

Optionally, wherein filtering the target account from the second account comprises:

determining, in the second tag information of the second account, candidate tag information matching with the first tag information; and filtering the target account from the candidate account, the candidate account being an account to which the candidate tag information belongs.

Optionally, wherein filtering the target account from the candidate account comprises any one of:

extracting keywords from the bullet screen content in the acquired bullet screen information; determining a related multimedia content of the target multimedia content, the related multimedia content being a multimedia content related to at least one of attributes and keywords of the target multimedia content; determining, in the related multimedia content, a candidate multimedia content related to the extracted keywords; determining third tag information corresponding to the candidate multimedia content; determining, in the tag information of the candidate account, the tag information matching with the third tag information; and determining the candidate account to which the matched tag information belongs as the target account; and determining a second tag level of the candidate tag information of the candidate account to which the candidate tag information belongs; filtering the target account from the candidate account based on the second tag level; wherein the target account satisfies any one of the followings: the second tag level of the target account is higher than the first tag level; the second tag level of the target account is lower than the first tag level; and the second tag level of the target account is equal to a specified tag level, the first tag level being a tag level of the first tag information of the first account.

Optionally, wherein determining the first tag information of the first account comprises any one of:

carrying the first tag information in each piece of the bullet screen information posted by the first account, and extracting the first tag information from any piece of the bullet screen information posted by the first account;

querying correspondence between the account and the tag information based on the first account, and acquiring the first tag information of the first account;

acquiring historical behaviors corresponding to the first account, and determining the first tag information based on the historical behaviors; and acquiring user attribute information corresponding to the first account, and determining the first tag information based on the user attribute information.

Optionally, the multimedia content is one of a picture, an audio and a video, and the bullet screen information further includes an account and a content related to the account.

According to a second aspect of embodiments of the present disclosure, there is provided a device for processing bullet screen. The device comprises:

a processor, a memory for storing a processor-executable instruction, wherein the processor is configured to execute the method for processing bullet screen.

According to a third aspect of embodiments of the present disclosure, there is provided a computer-readable storage medium, in which an instruction in stored, wherein when the computer readable storage medium runs at a processing component, the processing component is actuated to execute the method for processing bullet screen of the first aspect of embodiments of the present disclosure. The processor component may include processor or process chip.

According to a fourth aspect of embodiments of the present disclosure, there is provided a system for processing bullet screen, comprising a bullet screen managing server that comprises a device for processing bullet screen, wherein the device for processing bullet screen is configured to:

acquire bullet screen information and tag information of an account of a user watching a target multimedia content, the bullet screen information including a bullet screen content, and the tag information being configured to identify a type of the account; and determine, based on a matching result between the tag information and the bullet screen information, whether to display the bullet screen content in the bullet screen information while displaying the target multimedia content.

Optionally, the system further comprises:

a work display device and at least two terminals, wherein each of the at least two terminals is installed with a work display client;

the work display device is configured to display the multimedia content and is provided with identification information; and the work display client is configured to acquire the identification information, acquire the multimedia content displayed by the work display device based on the identification information, display the multimedia content, and display the bullet screen content for the multimedia content.

Optionally, the work display device comprises a primary display area and a secondary display area, wherein the primary display area is configured to display the multimedia content, and the secondary display area is configured to display the identification information.

Optionally, the work display device is an electronic frame, the primary display area being an area enclosed by a frame body of the electronic frame, and the secondary display area being an area on the frame body of the electronic frame.

Optionally, the frame body is provided with a display screen, and the secondary display area is an area where the display screen is located.

Optionally, the frame body satisfies any one of the followings:

the frame body is provided with an opening in which an array of light emitting diodes (LEDs) is embedded, the secondary display area being an area where the array of LEDs is located; and the frame body is made of a light transmissive material and provided with a cavity in which the array of LEDs is provided, the secondary display area being an area where the array of LEDs is located.

Optionally, optical information emitted by the array of LEDs is dynamically changing information, and the identification information is the optical information emitted by the array of LEDs within a specified time period.

Optionally, the identification information is displayed in a form of a two-dimensional code.

It should be understood that both the foregoing general description and the following detailed description are exemplary only and are not restrictive of the present disclosure.

BRIEF DESCRIPTION OF THE DRAWINGS

To describe the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

The drawings herein are incorporated in and constitute a part of this specification of the present disclosure, showing embodiments consistent with the present disclosure, and explaining the principles of the present disclosure together with the description.

DETAILED DESCRIPTION

In order to make objects, technical solutions and principles of the present disclosure more clearly, the present disclosure will be described in detail below with reference to drawings. It is obvious that the described embodiments are only a part of embodiments of the present disclosure, not all embodiments of the present disclosure. All the other embodiments achieved by those of ordinary skills in the art, based on the embodiments of the present disclosure without creative work, shall fall within the protection scope of the present invention.

Figure 1:
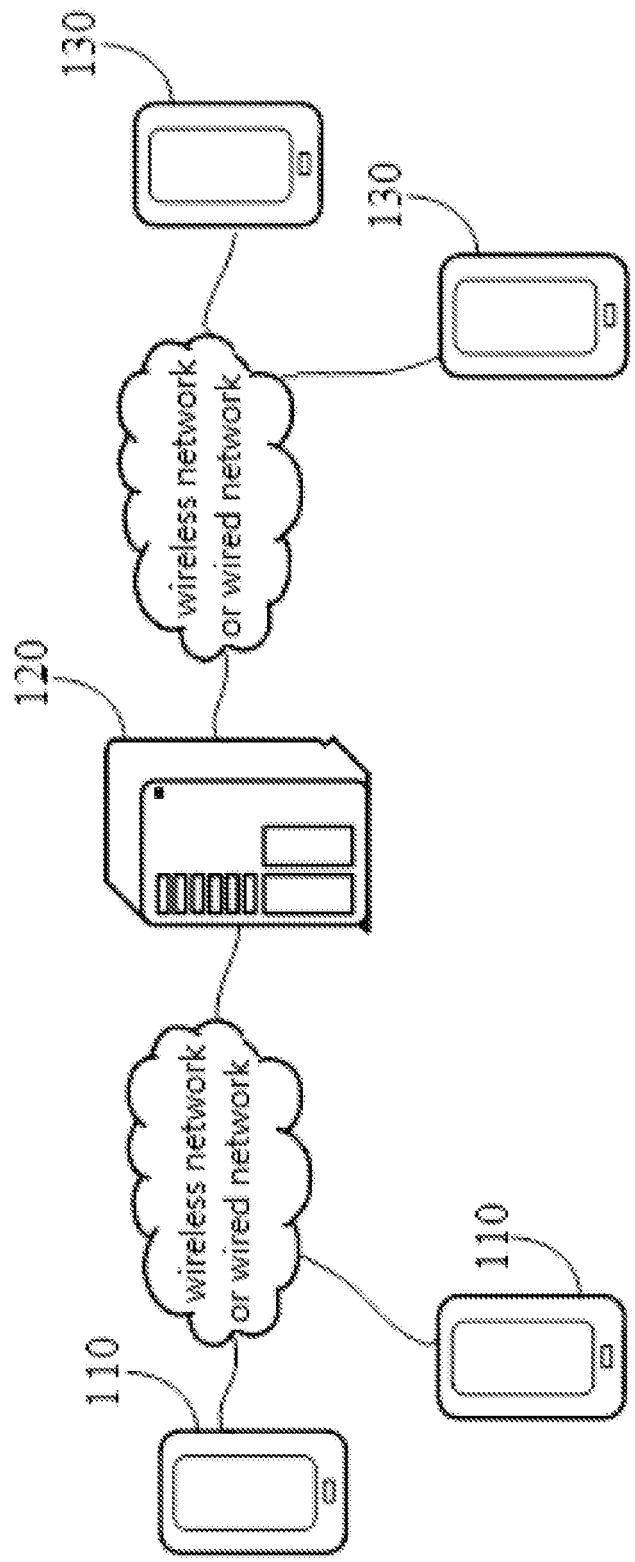
FIG. 1 is a schematic diagram of an environment of a method for processing bullet screen according to the related art.

Referring to FIG. 1 that is a schematic diagram of a system for processing bullet screen related to a method for processing bullet screen provided by a part of the embodiments of the present disclosure, the system for processing bullet screen may include at least one first terminal 110, a server 120, and at least one second terminal 130.

Each of the first terminal 110 and the second terminal 130 is a terminal having a transceiving function and a display function, such as, a smartphone, a computer, a multimedia player, an e-reader or the like.

The server 120 may be a server, a cluster of servers consisting of a plurality of servers, or a cloud computing service center.

Each of the first terminal 110 may be connected to the server 120 via a wired network or a wireless network, and the server 120 may be connected each of the second terminal 130 via a wired network or a wireless network. The first terminal 110 may send the bullet screen information carrying the bullet screen content, and the server 120 may receive and process the bullet screen information and then determine whether to send the bullet screen content in the received bullet screen information to the second terminal 130.

In examples of the present disclosure, a client for displaying multimedia content may be installed in each of the first terminal and the second terminal. The server is a server corresponding to the client and provides the multimedia content. The first terminal and the second terminal cooperate with the server to implement the bullet screen information processing.

In examples of the present disclosure, the multimedia content may include contents, such as, a picture, an audio, a video or the like. Displaying the multimedia content refers to displaying the content of the multimedia content per se and/or the related content, and what is watched by the audiences is the displayed multimedia content. For example, when the multimedia content is a picture, displaying the multimedia content may refer to displaying the picture and/or displaying the source of the picture. For another example, when the multimedia content is an audio, displaying the multimedia content may refer to displaying contents in a play interface of the audio, such as play progress, text corresponding to the audio, and/or pictures related to the audio; illustratively, when the audio is a song, the play interface of the audio may include: play progress, lyrics, singer photos, and/or album pictures. For yet another example, when the multimedia content is a video, displaying the multimedia content may refer to displaying the content of the video and/or the contents in the interface of the video.

Currently, when a plurality of users watches a same multimedia content, different users tend to have different attitudes and opinions on the same multimedia content. Thus, a phenomenon that the users send bullet screens with disagreement may occur or even the users may quarrel across the space through the bullet screen, which thereby affects the atmosphere when the users watch the multimedia content. Therefore, in the current bullet screen display process, the process of processing the bullet screen information has a low flexibility.

Figure 2:
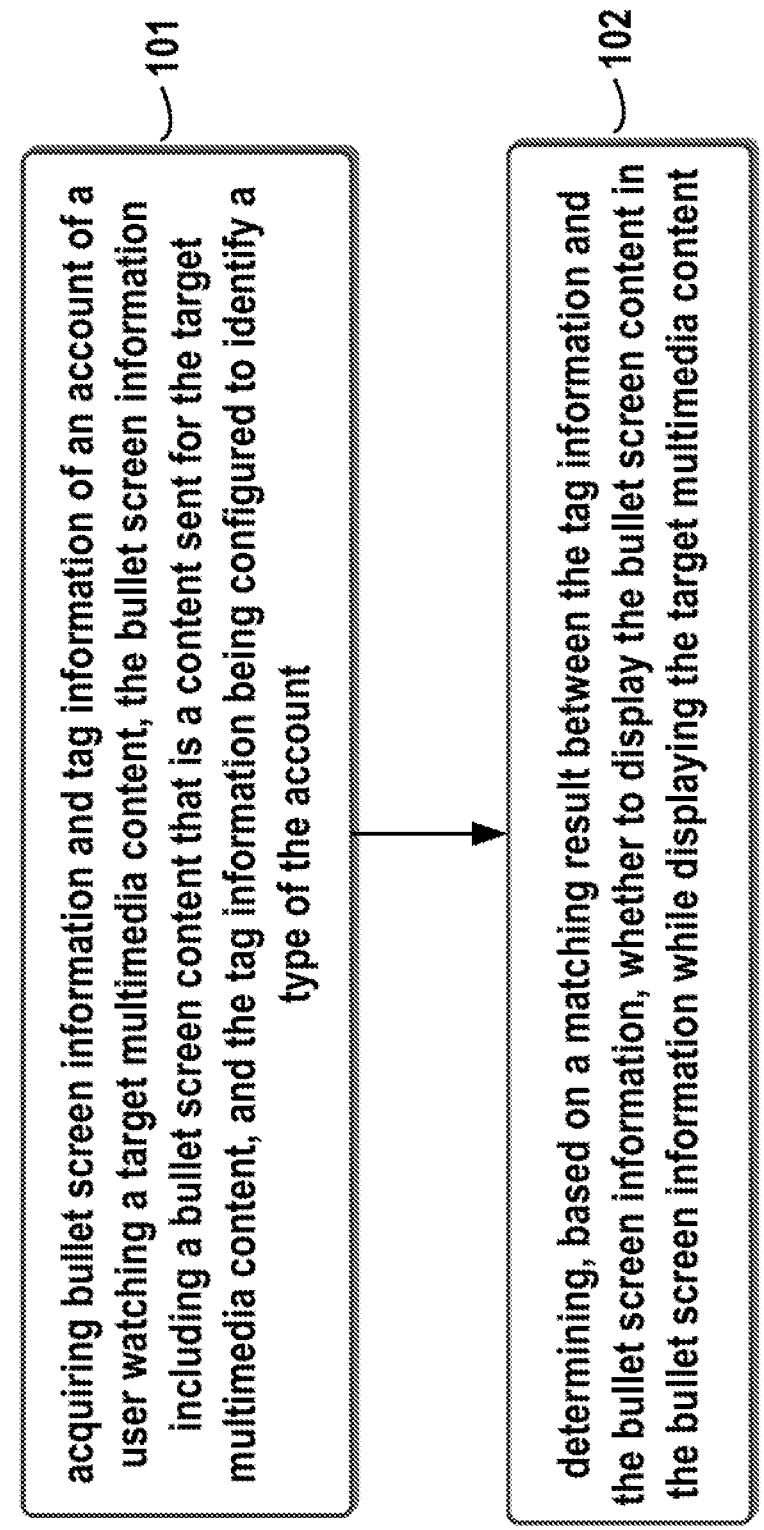
FIG. 2 is a schematic diagram of a method for processing bullet screen according to an exemplary embodiment.

In examples of the present disclosure, a method for processing bullet screen is provided to improve the flexibility in processing the bullet screen information, and as shown in FIG. 2, the method includes following steps.

Step 101, bullet screen information and a tag information of an account of a user watching a target multimedia content is acquired, wherein the bullet screen information includes a bullet screen content that is a content sent for the target multimedia content, and the tag information is configured to identify a type of the account.

It should be noted that the tag information of any account is a tag information set for the any one account, and the tag information is configured to identify the type of the any one account. The category of the type may be preset in a server by, for example, a user corresponding to the any one account or a user related to the user (such as, a friend of the user).

Step 102, whether to display the bullet screen content in the bullet screen information while displaying the target multimedia content is determined based on a matching result between the tag information and the bullet screen information.

In summary, in the method for processing bullet screen provided by embodiments of the present disclosure, the acquired bullet screen information may match with the tag information of the account of the user watching the target multimedia content, so as to determine, based on the matching result, whether to display the bullet screen content in the bullet screen information while displaying the target multimedia content, and then filter out the bullet screen information including the bullet screen content that is not required to display from the acquired bullet screen information, thereby improving the flexibility in processing the bullet screen information.

The method for processing bullet screen provided by embodiments of the present application is able to process the bullet screen information while playing the multimedia content. The multimedia content may be a picture, an audio or a video, and the bullet screen information may further include an account and a content related to the account, such as attribute information of the user. The attribute information is configured to indicate the information related to the user, such as age information, geographical location information, gender information, industry information of the user, or field information of the multimedia content of interest. The bullet screen processing process may be implemented by at least two manners, and will be described in embodiments of the present disclosure in following two examples that respectively correspond to a bullet screen receiver filtering function and a bullet screen sender filtering function.

In a first example, a target account is filtered based on the received bullet screen information, and the bullet screen content included in the bullet screen information is sent to the client on which the target account logs. The function corresponding to the first example is called the bullet screen receiver filtering function.

In the first example, the step 101 may comprise: the bullet screen information sent by the client on which the first account logs is received, the first account being an account of a user (which may be any user currently watching the target multimedia content or a user turning on the bullet screen receiver filtering function); that is, the user corresponding to the first account is a user currently watching the multimedia content; then, the first tag information under the first account is determined, and the second tag information of the second account of the user (such as, all of the users) currently watching the target multimedia content is acquired. Correspondingly, the step 102 comprises: a target account is filtered from the second account, the second tag information under the target account matching with the first tag information, then, the bullet screen content in the bullet screen information is sent to the client on which the target account logs, the client on which the target account logs being configured to display the bullet screen content while displaying the target multimedia content.

Figure 3:
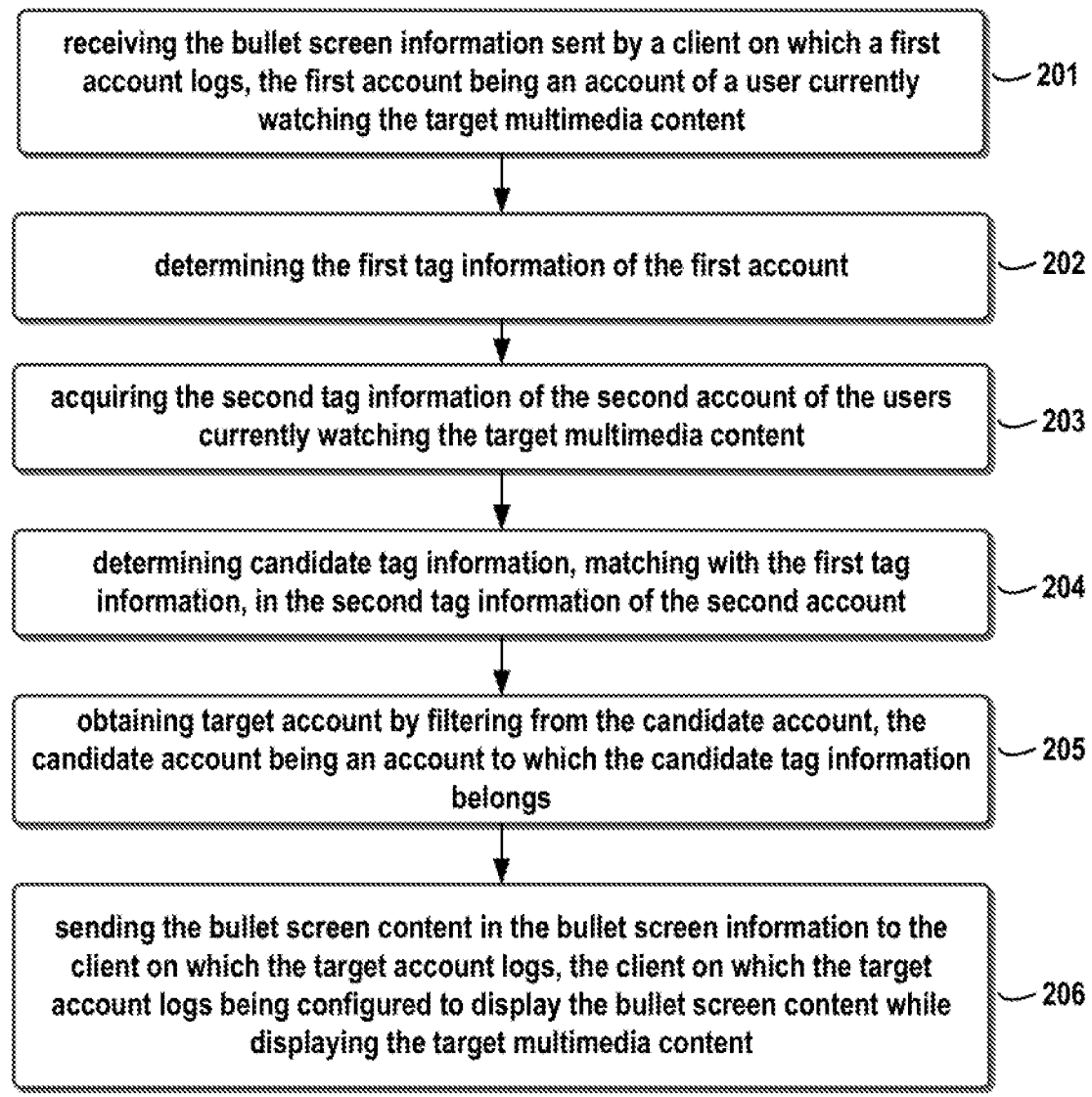
FIG. 3 is a schematic diagram of a method for processing bullet screen according to another exemplary embodiment.

Referring to FIG. 3 that is a method for processing the bullet screen corresponding to the first example, the method may be executed by the server in the environment shown in FIG. 1, and may include following steps.

Step 201, the bullet screen information sent by the client on which the first account logs is received, the first account being an account of a user currently watching the target multimedia content.

In the first example, when there is at least one user watching the target multimedia content, the server may receive the bullet screen information sent by the client on which the first account currently watching the multimedia content logs. Illustratively, if the server receives the bullet screen information sent by the client on which the first account C2 watching a music video "Do you hear the people sing" logs, the target multimedia content is the music video "Do you hear the people sing", and the terminal where the client on which the first account C2 logs is located may be regarded as the first terminal in the environment shown in FIG. 1.

In step 202, the first tag information of the first account is determined.

The server may determine the first tag information of the first account based on the received bullet screen information sent by the client on which the first account logs, and the first tag information is configured to identify the type of the first account. Illustratively, the first tag information may be anime fan, foodie master or photograph master, etc.

In an optional example, the server may determine the first tag information of the first account by following manners.

In a first determining manner, since each piece of the bullet screen information that is posted by the first account and acquired by the server carries the first tag information, the first tag information may be extracted from any piece of the bullet screen information posted by the first account. In examples of the present disclosure, the server may acquire the bullet screen information that is received recently and posted by the first account and thereby extract the first tag information from the bullet screen information.

Taking the bullet screen information received by the server in step 201 as an example, supposing the tag information carried in the bullet screen information is respectively music fan, piano master and composer, the server may totally extract three pieces of the first tag information of the first account C2 from the bullet screen information, which are music fan, piano master and composer.

In a second determining manner, the first tag information of the first account is acquired by querying, based on the first account, the correspondence between the account and the tag information.

The correspondence between the account and the tag information may be stored in advance in the server, and the first tag information of the first account may be acquired by querying the correspondence. Illustratively, the correspondence between the account and the tag information stored in advance is as shown in Table 1. In Table 1, the tag information of the account C1 totally includes three pieces of the first tag information, which are movie fan, photograph mania and art master, and the tag information of the account C2 totally includes three pieces of the first tag information, which are music fan, piano master, and composer. The first tag information of the first account may be acquired by querying the Table 1. It shall be noted that the Table 1 is merely an exemplary description of the correspondence between the account and the tag information, and does not limit the present disclosure.

TABLE 1

| Account | Tag information |
|---|---|
| C1 | Movie fan, Photograph mania, Art master |
| C2 | Music fan, Piano master, Composer |
| C3 | Food complex, Dessert chief, Photograph talent |

Supposing that the first account is the first account C2 in the example of step 201, it can be seen by querying the Table 1 that the tag information of the first account C2 totally includes three pieces of the first tag information, which are music fan, piano master, and composer.

In the third determining manner, historical behaviors corresponding to the first account are acquired, and the first tag information is determined based on the historical behaviors.

The server may determine the first tag information through the acquired historical behavior corresponding to the first account. The historical behavior refers to the behavior performed before the current moment, and the historical behaviors may include at least one of the watching behavior, the favorite behavior, the like behavior, and the bullet screen posting behavior of the first account.

In the first example, the server may acquire the historical behaviors within a specified historical period (such as, the last week, last month, or last year) or a specified number of times (such as, the last hundred times), and then acquire a plurality of behavior sets by classifying the acquired historical behaviors based on a specified rule, each behavior set including at least one historical behavior of the same type. For example, the behavior sets acquired after the classification are sorted in a descending order of the number of corresponding historical behaviors of each behavior set to obtain the first n behavior sets after the sorting; then, the tag information corresponding to the types of the first n behavior sets is determined as the first tag information, wherein n is a positive integer. For example, the aforesaid specified rule may be that the historical behaviors are classified according to the type of the multimedia content to which the historical behaviors are performed; that is, the type of each of the behavior sets is the type of the multimedia content. In another example, the aforesaid specified rule may be that the historical behaviors are classified according to the behavior type of the historical behaviors; that is, the type of each of the behavior sets is of the behavior type. The server may maintain the correspondence between the type and the tag information, and determine the tag information corresponding to the type of the multimedia content by querying the correspondence.

The historical behaviors that include the favorite behavior are taken as an example here. Supposing n=1, the specified historical period is the last week, and the specified rule is that the historical behaviors are classified according to the type of the multimedia content to which the historical behaviors are performed, if the user adds videos of the piano performance type into favorites for 10 times and videos of the comedy type into favorites for 8 times in the last week with the first account C2, the server may classify the acquired historical behaviors and obtain two behavior sets with one being the piano performance type and the other being the comedy type. Then the behavior sets obtained after the classification are sorted in a descending order of the number of the favorite behaviors, and the tag information, "piano master", corresponding to the piano performance type that is the behavior set ranked at the first place is determined as the first tag information.

The historical behaviors that include the favorite behavior and the like behavior are taken as an example here. Supposing n=1, the specified historical period is the last week, and the specified rule is that the historical behaviors are classified according to the behavior type of the historical behaviors, if the user adds videos into favorites for 10 times and likes the videos for 8 times in the last week with the first account C2, the server may classify the acquired historical behaviors and obtain two behavior sets with one being the favorite type and the other being the like type. Then the behavior sets obtained after the classification are sorted in a descending order of the number of the historical behaviors, and the tag information, "favorites amateur", corresponding to the favorite type that is the behavior set ranked at the first place is determined as the first tag information.

In a second example, the server may acquire the historical behaviors within a specified historical period (such as, the last week, last month, or last year) or a specified number of times (such as, the last hundred times), and then determine the tag information corresponding to the type of the multimedia content to which the historical behaviors that have a number greater than the specified threshold number are performed as the first tag information. Referring to the first example, the server may determine the tag information corresponding to the type of the multimedia content by querying the correspondence between the type and the tag information.

The historical behaviors that include the watching behavior are taken as an example here. Supposing the threshold number is 5 and the specified historical period is the last week, if the user watches the videos of the musical type, such as "Miss Saigon", "Phantom of the Opera" and "Les Miserables", for 8 times in the last week with the first account C2, it can be determined that the number of the watching behaviors corresponding to the musical type is greater than 5, and the tag information corresponding to the musical type is determined as music fan, piano master and composer by querying the correspondence or the like. Thus, the server may determine that there are totally three pieces of the first tag information of the first account C2, which are music fan, piano master, and composer.

It should be noted that the aforesaid two examples may be executed separately or executed together according to the specific situation. If the examples are executed together, historical behaviors, for example, having a number greater than the specified threshold number may be acquired firstly, and the acquired historical behaviors are classified based on a specified rule to obtain a plurality of behavior sets. Then, the behavior sets obtained after the classification are sorted in a descending order of the number of corresponding historical behaviors of each behavior set to obtain the first n behavior sets after the sorting. The tag information corresponding to the type of the first n behavior sets is determined as the first tag information, which will not be given again in embodiments of the present disclosure.

In the fourth determining manner, the user attribute information corresponding to the first account is acquired, and the first tag information is determined based on the user attribute information.

The attribute information of the user is configured to indicate the attribute of the user, such as age information, geographical location information, gender information, and industry information, or field information of the multimedia content of interest. The age information may be the user's age range (such as, 20 to 30 years old), the specific age (such as, 28 years old) or the specific date of birth (such as, Feb. 15, 1989). The geographical location information may be the country from which the user comes (such as, China, the United States), the administrative units (such as, Beijing, New Jersey or Xinxiang County), or geographic areas (such as, the Northwest). The industry information may be the user's occupational field (such as, agriculture or service industry) or specific occupations (such as, driver). The field information of the multimedia content of interest may be the plot field of the multimedia content (such as, the field including a comedy type, a tragedy type, or a suspense type), the art field of multimedia content (such as, the field including a painting type, a music type, or a design type) or the presentation field of the multimedia content (such as, the field including, for example, a movie type, a TV drama type, or a musical type).

Optionally, the server may acquire in advance the user attribute information corresponding to each account, and then determine the user attribute information corresponding to the first account after receiving the bullet screen information sent by the client on which the first account logs.

The server may employ a plurality of manners to acquire the user attribute information corresponding to respective accounts. For example, the attribute information page may be provided in a specified scenario in advance, wherein the attribute information page may display a plurality of attribute information options from which the user may select the corresponding attribute information; and/or, the attribute information page may display an input box into which the user inputs the corresponding attribute information. The specified scenario may be a scenario where the user registers with the server through the client, a scenario where the user turns on the bullet screen receiver filtering function or the bullet screen sender filtering function in the client, or a scenario where the user turns on other functions in the client. For another example, the server may acquire the user attribute information corresponding to respective accounts from other third-party servers.

Optionally, the server may establish the correspondence between the user attribute information and the tag information, and determine the tag information corresponding to the user attribute information of the first account by querying the correspondence.

Illustratively, the server may establish the correspondence between the attribute information and tag information of the user according to at least one piece of the attribute information of the user. Illustratively, by querying the correspondence, the first tag information may be determined as student since the age range information is 15 to 20 years old; the first tag information may be determined as laugh-making talent since the plot type of the multimedia content of interest is a comedy type; and the first tag information may be determined as student since the industry information is student.

It should be noted that the manner of acquiring the first tag information is only an exemplary description, but not a limit for the manners of acquiring the first tag information in embodiments of the present disclosure.

Step 203, the second tag information of the second account of the user currently watching the target multimedia content is acquired.

Illustratively, the second account may be the accounts, including the first account, of all the users watching the target multimedia content. The manner of acquiring each of the plural pieces of the second tag information may refer to any one of the manners of acquiring the first tag information of the first account in step 202.

Illustratively, supposing a plurality of second accounts currently watching the musical video "Do you hear the people sing" are receptively the second accounts D1, D2, D3, D4 and D5, it can be determined, by any one of examples for determining the tag information in step 202, that there are totally three pieces of the second tag information of the second account D1, which are hipster, photograph mania and food complex; there are totally two pieces of the second tag information of the second account D2, which are technology complex and science popularization talent; there are totally three pieces of the second tag information of the second account D3, which are pianist, music fan and composer, there are totally three pieces of the second tag information of the second account D4, which are movie fan, composer, and hipster, and there are totally three pieces of the second tag information of the second account D5, which are food complex, dessert chef, and photograph mania.

Step 204, the candidate tag information matching with the first tag information is determined in the second tag information under the second account.

There is a plurality of manners for the server to determine the candidate tag information in the second tag information of the second account. Optionally, the tag information may be information in the form of text, and the server may match the text of each piece of the second tag information with the text of the first tag information based on a text matching algorithm to obtain a similarity degree between each piece of the second tag information and the first tag information. Then, the first p pieces of the second tag information that have the highest similarly degrees will be determined as the candidate tag information, and the second account to which the candidate tag information belongs is determined as the candidate account, where p is a positive integer, such as, 1 or 2.

Optionally, the server may determine the candidate tag information based on a vector matching algorithm. The process may include: converting, by the server, the first tag information into a first vector; converting each piece of the second tag information into a second vector, calculating the distance from each second vector to the first vector, respectively; determining the first q pieces of the second tag information that have the shortest distance as the candidate tag information, namely, the second tag information matching with the first tag information, where q is a positive integer, such as, 1 or 2; and determining the account corresponding to the candidate tag information as the candidate account.

Illustratively, supposing q=2, and the plural pieces of the second tag information are 14 pieces of the second tag information of the plurality of second accounts D1, D2, D3, D4 and D5 as determined in the example in step 203, the first tag information is converted to obtain the first vector L1, and the 14 pieces of the second tag information are respectively converted to obtain the vectors L2-L15. Then, the distance from the first vector L1 to the second vectors L2-L15 is calculated respectively to obtain the corresponding distances X2-X15, and the distances are sorted in an ascending order to determine the first two distances X7 and X10, thereby obtaining the second vectors L7 and L10 corresponding to the X7 and X10. Since the second vector L7 is obtained by converting the second tag information, "pianist", of the second account D3, and the second vector L110 is obtained by converting the second tag information, "movie fan", of the second account D4, the second tag information, "pianist" and "movie fan", is the candidate tag information, and the second accounts D3 and D4 are the candidate accounts.

Step 205, the target account is filtered from the candidate account, the candidate account being an account to which the candidate tag information belongs.

In embodiments of the present disclosure, the target account may be further determined in the candidate account, and the client on which the target account logs is a client to which the bullet screen content in the bullet screen information will be sent. The server may have a plurality of manners to filter the target account from the candidate account. In a first manner, the server filters the target account from the candidate account through extracted keywords, and the process may include following steps.

Step A1, keywords from the bullet screen content in the acquired bullet screen information are extracted.

The bullet screen content in the bullet screen information may be content in the form of text, and the server may extract keywords from the bullet screen content based on a keyword extracting algorithm.

Step A2, the related multimedia content of the target multimedia content is determined, wherein the related multimedia content is the multimedia content related to at least one of attributes and keywords of the target multimedia content.

The attributes of the multimedia content reflect the nature of the multimedia content itself. Illustratively, when the multimedia content is a movie, the attributes may include the same series, the same director, the same screenwriter, the same producer, the same soundtrack, or the like; and when the multimedia content is a painting, the attributes may include the same author, or the same dynasty.

For example, if the multimedia content is one movie among a movie series, the multimedia content related to its attributes is the other movies in the series. For instance, if the multimedia content is "Mission Impossible I", the related multimedia content may be "Mission Impossible II", "Mission Impossible III", "Mission Impossible IV", "Mission Impossible V" and "Mission Impossible VI". For another example, if the multimedia content is a classic movie, the multimedia content related to its attribute may be a remake movie or other movies that pay a tribute to the movie. For yet another example, if the multimedia content is a famous painting, the multimedia content related to its attribute may be other paintings facsimileing the famous painting. For yet another example, if the multimedia content is a music video "Do you hear the people sing", the related multimedia content, in terms of the soundtrack attribute, of the music video "Do you hear the people sing" may be the movie "Les Miserables", the TV series "Stand by me" and the musical "Les Miserables", because the musical "Les Miserables", the movie "Les Miserables" and the TV series "Stand by me" are all configured with the same soundtrack "Do you hear the people sing", and thereby a relationship may be established between the music video "Do you hear the people sing" and the movie "Les Miserables", the TV series "Stand by me" and the musical "Les Miserables".

The keywords of the multimedia content reflect the actual information carried in the multimedia content, generally the word appearing in the multimedia content at a high frequency (namely, the word appearing at a frequency higher than a specified frequency, or the top k words appearing at the highest frequency, k being a positive integer). For example, in terms of the keyword "Hugo", the related multimedia content of the multimedia content, which is the music video "Do you hear the people sing", may be determined as the movie "Les Miserables" and the musical "Les Miserables".

For each of the multimedia contents stored in the server, the server may determine the related multimedia content of the multimedia content based on the relevance of the attributes and/or the relevance of the keywords in advance, and record the related multimedia content of each of the multimedia contents. The recording may be made in a manner of table, pointer, or graph, which is not limited in embodiments of the present disclosure.

Step A3, the candidate multimedia content related to the extracted keywords is determined in the related multimedia content.

For example, the server may maintain the correspondence between the keywords and the multimedia content in advance, query the correspondence between the keywords and the multimedia content based on the extracted keywords to obtain at least one multimedia content, and then use the intersection between the at least one multimedia content and the related multimedia content as the candidate multimedia content related to the extracted keywords.

For another example, the server may obtain keywords of each of the related multimedia contents, and match the extracted keywords with the keywords of each of the related multimedia contents through a text matching algorithm or a vector matching algorithm, the related multimedia content obtained by the matching is the candidate multimedia content related to the extracted keywords.

Step A4, third tag information corresponding to the candidate multimedia content is determined.

Illustratively, the server may establish a correspondence between the multimedia content and the tag information in advance, and acquire the third tag information corresponding to the candidate multimedia content by querying the correspondence.

Further illustratively, referring to the aforesaid step 202, the server may either maintain the correspondence between the type and the tag information, the server may determine the type of each of the candidate multimedia contents, and then query the correspondence between the type and the tag information based on the determined type, so as to acquire the third tag information corresponding to the candidate multimedia content.

Step A5, the tag information matching with the third tag information is determined in the tag information under the candidate account, and then the candidate account to which the matched tag information belongs is determined as the target account.

It should be noted that the amount of the tag information of the candidate accounts is greater than or equal to the amount of the candidate tag information. In a first optional manner, the tag information matching with the third tag information may be determined in all of the tag information of the candidate accounts. In a second optional manner, the tag information matching with the third tag information may be determined in the candidate tag information. The number of the target accounts acquired by the filtering preformed in the first optional manner is generally greater than the number of the target accounts acquired by the filtering performed in the second optional manner, and the two filtering manners can be selected according to the actual situation.

The server may match the tag information of each of the candidate accounts with the third tag information based on a text matching algorithm or a vector matching algorithm to obtain the matched tag information. Please refer to the aforesaid step 204 for the matching process.

Illustratively, in step A1, the keyword of the bullet screen content in the bullet screen information is "Hugo", and the target multimedia content is the music video "Do you hear the people sing". Based on step A2, the multimedia contents related to the target multimedia content is determined to be the movie "Les Miserables", the musical "Les Miserables", and the TV series "Stand by me". Based on step A3, the candidate multimedia contents related to the extracted keyword "Hugo" is determined to be the movie "Les Miserables" and the musical "Les Miserables". Based on step A4, the third tag information corresponding to the movie "Les Miserables" is determined to include movie fan, and the third tag information corresponding to the musical "Les Miserables" is determined to include music mania.

Supposing the tag information of the candidate account D3 includes pianist, music fan, and composer, and the tag information of the candidate account D4 includes movie fan, composer and hipster, if the tag information "movie fan" of the candidate account D4 is matched with the third tag information "movie fan" based on the text matching algorithm or the vector matching algorithm, the tag information matching with the third tag information is "movie fan", and the candidate account D4 to which the "movie fan" belongs is determined as the target account.

In a second example, the server filters the target account from the candidate account through a first tag level, and the process may include following steps.

Step B1, the second tag level of the candidate account to which the candidate tag information belongs is determined.

Optionally, referring to the aforesaid step 204, the candidate tag information may be determined by a text matching algorithm or a vector matching algorithm.

Illustratively, supposing there are totally three pieces of the first tag information that are respectively music fan, piano master, and composer, there are totally three pieces of the second tag information of the candidate account D3, which are pianist, music fan, and composer, and there are totally three pieces of the second tag information of the candidate account D4, which are movie fan, composer, and hipster, the pianist and music fan included in the second tag information of the candidate account D3 are determined as the candidate tag information by the vector matching algorithm.

Furthermore, the server may store the tag level relationship in advance, and the tag level relationship records the correspondence between the tag level and different tag information. For example, the tag level of the tag information from photograph fan, photographer, to photograph master is sequentially increased. By querying the tag level relationship, the level of the candidate tag information in other tag information of the same field may be determined, and the second tag level of the candidate tag information of the corresponding candidate account may be obtained based on the determined level of the candidate tag information. Illustratively, supposing the determined candidate tag information is pianist, the correspondence between the tag information in the field of piano performance and the tag level is recorded in the tag level relationship. For example, the tag level of the tag information increases in sequence from beginner, pianist, to piano master. Thus, it can be determined by querying the tag level relationship that the tag level of pianist is higher than the beginner but lower than the piano master. Illustratively, the tag level may be represented by a mathematical character, and the tag level is positively correlated with the mathematical character. For example, if the tag level is 0 to d, the d level is the highest level and the 0 level is the lowest level, where d is a positive integer. Of course, the tag level may also be negatively correlated with the mathematical character or otherwise represented, which is not limited by embodiments of the present disclosure.

Step B2, the target account is filtered from the candidate account based on the first tag level and the second tag level, the first tag level being a tag level of the first tag information of the first account.

The step B2 may be implemented by a plurality of manners, and following manners will be described in the present disclosure as examples.

In the first manner, the candidate account having a second tag level higher than the first tag level is correspondingly determined as the target account.

In the second manner, the candidate account having a second tag level lower than the first tag level is correspondingly determined as the target account.

In the third manner, the candidate account having a second tag level equal to the specified tag level is correspondingly determined as the target account.

Illustratively, supposing the first tag information of the first account C2 includes music fan, piano master, and composer, the corresponding first tag level may respectively be Level 1, Level 2, and Level 2. Please refer to the example in the aforesaid step B1, supposing the candidate tag information includes pianist and music fan, the corresponding second tag level may respectively be Level 1 and Level 1.

Comparing the first tag level (Level 2) corresponding to the first tag information "piano master" with the second tag level (Level 1) corresponding to the candidate tag information "pianist", the first tag level corresponding to the "piano master" is greater than the second tag level corresponding to the "pianist".

Comparing the first tag level (Level 1) corresponding to the first tag information "music fan" with the second tag level (Level 1) corresponding to the candidate tag information "music fan", they are equal to each other.

Accordingly, if the target account is determined by the first manner, no target account exits. If the target account is determined by the second manner, the candidate account D3 corresponding to the candidate information that is pianist is determined as a target account.

The target account acquired by the aforesaid filtering process in step 205 has a higher accuracy, so that the bullet screen receiver as acquired by filtering is more accurate, thereby improving pertinence of the bullet screen.

Optionally, after step 204, the server may directly determine the candidate account as the target account. For example, the candidate accounts D3 and D4 determined in step 204 are directly determined as the target account, so as to avoid the filtering process and thereby reduce the calculating cost.

Step 206, the bullet screen content in the bullet screen information is sent to the client on which the target account logs, the client on which the target account logs being configured to display the bullet screen content while displaying the target multimedia content.

Based on the determined target account, the server sends the bullet screen content in the bullet screen information to the client on which the target account logs. Supposing the target accounts are accounts D3 and D4, the server extracts the bullet screen content in the bullet screen information sent by the client on which the first account C2 logs, and then sends the bullet screen content to the client on which the accounts D3 and D4 log. Still taking step 201 as the example, the client on which the accounts D3 and D4 log may display the aforesaid bullet screen content while displaying the music video "Do you hear the people sing". Illustratively, the bullet screen content may be displayed in the multimedia content or in a free space outside the multimedia content.

The subsequent server finally sends the bullet screen content to the client on which the determined target account logs, thus, if the first manner in step B2 is employed, the bullet screen content provided by the first account may be sent to an account having a higher tag level, so that the user corresponding to the target account may see the bullet screen content posted by the account corresponding to the user having a lower level of the same filed. Thus, the bullet screen content may be a certain reference to the user corresponding to the target account, and for the target account, the current bullet screen display mode is a basic mode. By employing the second manner in step B2, the bullet screen content provided by the first account may be sent to an account having a lower tag level, so that the user corresponding to the target account may see the bullet screen content posted by the account corresponding to the user having a higher level of the same field, which enables the user to perform the corresponding learning based on the bullet screen content. Thus, for the target account, the current bullet screen display mode is a learning mode. By employing the third manner in step B2, the bullet screen content provided by the first account may be sent to an account having a tag level equal to the specified tag level. The specified tag level may be specified by the first account, so that only the user meeting the requirement of the user corresponding to the first account can see the bullet screen content. Therefore, the flexibility of the bullet screen display is rather high.

After step 206, the server may prohibit sending the bullet screen content in the bullet screen information to the client on which other accounts log, and the other accounts are accounts other than the target account among all the accounts of the user watching the target multimedia content. Or, the bullet screen content will not be sent to the client on which other accounts log.

Illustratively, supposing the client on which Xiaoming's account logs is watching "Peppa Pig" and sends bullet screen information carrying the bullet screen content of "Peppa Pig reminds me of Crayon Shinchan", the server may filter the target account based on the tag information of Xiaoming's account from the accounts of Xiaohua, Xiaobai and Xiaohei, who are also watching the "Peppa Pig", and then display the bullet screen content at the client on which the target account logs. Supposing the tag information of Xiaoming's account is primary school student and anime fan, the tag information of Xiaohua's account is college student and photographer, the tag information of Xiaobai's account is comics fan and boy, and the tag information of Xiaohei's account is food complex and photographer, the server may determine Xiaobai's account as the target account based on the matching result between the tag information of Xiaoming's account and the tag information of the other three's accounts, and further display the bullet screen content when Xiaobai is watching the "Peppa Pig".

In summary, in the first bullet screen processing manner provided by embodiments of the present disclosure, the bullet screen information sent by the client on which the first account logs is selectively displayed, based on the tag information of the first account, on the client on which the second account that is watching the same multimedia content logs, thereby improving the flexibility and pertinence of the bullet screen information processing and realizing filtering of the bullet screen content at the client. That is, for the client on which the first account logs, the receivers of the bullet screen content are filtered, and the receivers that are filtered out will not receive the bullet screen content sent by the client on which the first account logs.

In the second example, the bullet screen information is filtered for the user currently watching the target multimedia content, and the bullet screen content in the bullet screen information obtained by the filtering will be sent to the client on which the user's account logs. The function corresponding to the second example is called the bullet screen sender filtering function.

In the second example, the step 101 may include: the bullet screen information posted for the target multimedia content is acquired, then the first tag information of the first account is determined; the first account is an account of a user currently watching the target multimedia content (which may be any user currently watching the target multimedia content or a user turning on the bullet screen receiver filtering function). That is, the user corresponding to the first account is a user currently watching the multimedia content. Correspondingly, the step 102 may include: the second tag information of the second account, from which each piece of the bullet screen information is derived, is acquired. Then, a target account is filtered from the second account (such as, all the second accounts from which the bullet screen information is derived), and the second tag information of the target account matches with the first tag information, finally, the bullet screen content in the bullet screen information derived from the target account is sent to the client on which the first account logs, and the client on which the first account logs is configured to display the bullet screen content while displaying the target multimedia content.

Figure 4:
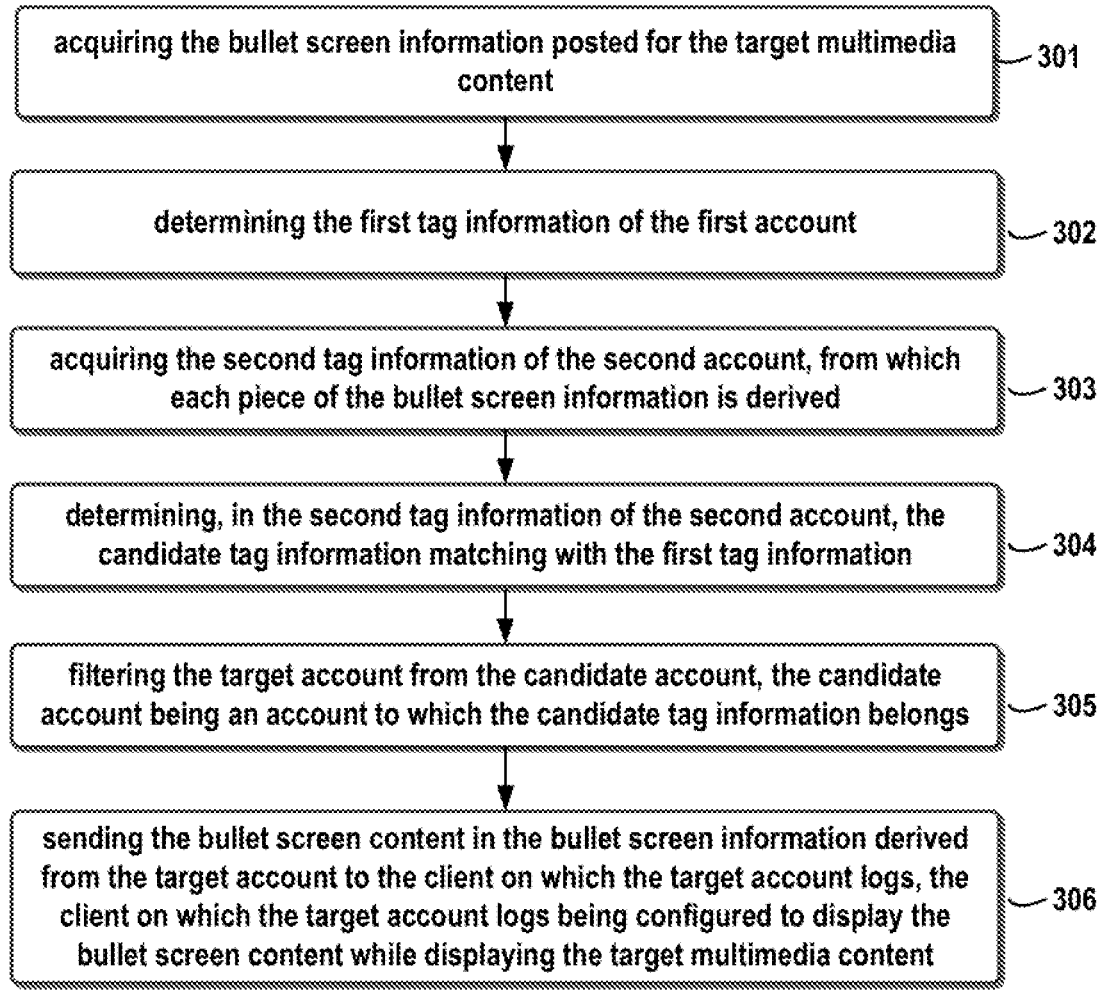
FIG. 4 is a schematic diagram of a method for processing bullet screen according to yet another exemplary embodiment.

Referring to FIG. 4 that is a method for processing bullet screen corresponding to the second example, the method may be executed by the server in the environment shown in FIG. 1, and may include following steps.

Step 301, the bullet screen information posted for the target multimedia content is acquired.

In the second example, the server may acquire plural pieces of the bullet screen information posted for the multimedia content. The acquiring process may be receiving in real time the plural pieces of the bullet screen information posted for the multimedia content, receiving periodically the plural pieces of the bullet screen information posted for the multimedia content, or acquiring the plural pieces of the pre-stored bullet screen information posted for the multimedia content.

The server may extract the bullet screen content in the acquired bullet screen information for the target multimedia content, and the extracted bullet screen content is originally configured to be sent to each of the users who are watching the target multimedia content. In embodiments of the present disclosure, the server may further filter the extracted bullet screen content before sending to the corresponding client. In embodiments of the present disclosure, taking the client on which the first account logs as an example, the process of processing the bullet screen information sent by the client on which other accounts log may refer to the client on which the first account logs, the first account being an account of a user currently watching the target multimedia content. Illustratively, if the user corresponding to the first account E1 is watching "Isle of Dogs", the server may receive the bullet screen information posted for the "Isle of Dogs" and extract the bullet screen content. The terminal where the client on which the first account E1 logs is located may be deemed as the second terminal in the environment shown in FIG. 1.

In step 302, the first tag information of the first account is determined.

In the second example, the manner for the server to determine the first tag information of the first account may refer to the aforesaid step 202, which will not be described again in embodiments of the present disclosure. The server may determine the first tag information of the first account by the first determining manner in the aforesaid step 202.

Illustratively, the server acquires the bullet screen information that is received recently and posted by the first account E1. Supposing the tag information carried in the bullet screen information is movie fan, photographer, and junior director, the server may determine that there are totally three pieces of the first tag information of the first account E1 that are movie fan, photographer and junior director.

Step 303, the second tag information of the second account, from which each piece of the bullet screen information is derived, is acquired.

The server acquires, based on the bullet screen information acquired in step 301 (for example, all the bullet screen information), each piece of the second tag information of the second account from which each piece of the bullet screen information is derived. The manner of acquiring each piece of the second tag information may refer to any one of the manners of acquiring the first tag information of the first account in the aforesaid step 202, which will not be given again in embodiments of the present disclosure.

Illustratively, the second accounts, from which each piece of the bullet screen information acquired by the server in step 301 is derived, are F1, F2, F3, F4, and F5, respectively. Correspondingly, there are totally three piece of the second tag information of the second account F1 determined referring to the aforesaid step 202, which are hipster, photograph mania, and food complex; there are totally two pieces of the second tag information of the determined second account F2, which are painting master and photographer, there are totally three pieces of the second tag information of the determined second account F3, which are senior director, artist and scriptwriter; there are totally three pieces of the second tag information of the determined second account F4, which are technology complex, science popularization talent, and programmer, and there are totally two pieces of the second tag information of the determined second account F5, which are pianist and arranger.

Step 304, the candidate tag information matching with the first tag information is determined in the second tag information under the second account.

The process for the server to determine the candidate tag information may refer to the aforesaid step 204, and will not be described again in embodiments of the present disclosure. Embodiments of the present application will be described by taking the example that the server determines the candidate tag information based on the vector matching algorithm. Illustratively, supposing q=3, and supposing the first tag information is the first tag information determined in the aforesaid step 302 and the plural pieces of the second tag information are the 13 pieces of the second tag information determined in the aforesaid step 302, the first tag information is then converted to obtain the first vector Y1, and the 13 pieces of the second tag information are respectively converted to obtain the vectors Y2-Y14. Then, the distance from the first vector Y1 to the second vectors Y2-Y14 is calculated respectively to obtain the corresponding distances Z2-Z14, and the distances are sorted in an ascending order to determine the first three distances Z2, Z5 and Z6, thereby obtaining the second vectors Y2, Y5 and Y6 corresponding to the Z2, Z5 and Z6. Since the second vector Y2 is obtained by converting the second tag information, "photograph mania", of the second account F1, the second vector Y5 is obtained by converting the second tag information, "photographer", of the second account F2, and the second vector Y6 is obtained by converting the second tag information, "senior director", of the second account F3, the second tag information, "photograph mania", "photographer" and "senior director", is the candidate tag information, and the second accounts F1, F2 and D3 are the candidate accounts.

Step 305, the target account is filtered from the candidate account, the candidate account being an account to which the candidate tag information belongs.

In examples of the present disclosure, the target account is further determined in the candidate account, and the manner for the server to filter the target account in the candidate accounts may refer to the aforesaid step 205, which will not be described again in embodiments of the present application.

If the first manner in step 205 is employed, illustratively, the keyword of the bullet screen content in the bullet screen information is "colorful frame", and the target multimedia content is the movie "Isle of Dogs" in step A1. Based on step A2, the related multimedia contents determined according to the attribute of the same director are the movie "Budapest Hotel" and the movie "Ofline Cannon". Based on step A3, the candidate multimedia content related to the extracted keyword "colorful frame" is determined to be the movie "Budapest Hotel". Based on step A4, the third tag information corresponding to the movie "Budapest Hotel" is determined to include photographer. Stilling taking the example in step 304 as an example, there are totally three pieces of the second tag information of the candidate account F1, which are hipster, photographer and food complex; there are totally two pieces of the second tag information of the candidate account F2, which are painting master and photographer, and there are totally three pieces of the second tag information of the candidate account F3, which are senior directors, artists, and scriptwriters. Based on step A5, the server may determine that the second tag information "photographer" of the candidate account F2 matches with the third tag information "photographer" based on the text matching algorithm or the vector matching algorithm. Thus, the tag information matching with the third tag information is "photographer", and the candidate account F2 to which the "photographer" belongs is determined as the target account.

If the second manner in step 205 is employed, illustratively, three pieces of the first tag information of the first account E1 in step 301, which are movie fan, photographer, and junior director and three candidate accounts F1, F2 and F3 as determined in step 204 are taken as examples to illustrate the process of determining the target account. There are three pieces of the second tag information of the candidate account F1, which are hipster, photograph mania and food complex; there are two pieces of the second tag information of the candidate account F2, which are paint master and photographer; there are three pieces of the second tag information of the candidate account F3, which are senior director, artist and scriptwriter. The photograph mania included in the second tag information of the candidate account F1, the photographer included in the second tag information of the candidate account F2, and the senior director included in the second tag information of the candidate account F3 are determined as the candidate tag information by a vector matching algorithm. Then, by querying the tag level relationship, it can be determined that the candidate tag information, photograph mania, photographer, and senior director, is respectively ranked at Level 1, Level 2 and Level 3 in the respective level relationships. Thus, the second tag level of the candidate tag information, "photograph mania", of the corresponding candidate account F1 is Level 1; the second tag level of the candidate tag information, "photographer", of the corresponding candidate account F2 is Level 2; and the second tag level of the candidate tag information, "senior director", of the corresponding candidate account F3 is Level 3. Meanwhile, the server may determine that the first tag levels of the first candidate tag information, "photographer" and "junior director", are respectively Level 2 and Level 1.

Optionally, when the server determines the candidate account whose second tag level is higher than the first tag level as the target account, the second tag level (that is, Level 3) of the candidate tag information "senior director" corresponding to the candidate account F3, among the candidate accounts F1, F2, and F3, is higher than the first tag level (that is, Level 1) corresponding to the "junior director", and the server determines the candidate account F3 as the target account. Optionally, when the server determines the candidate account whose second tag level is lower than the first tag level as the target account, the second tag level (that is, Level 1) of the candidate tag information "photograph mania" corresponding to the candidate account F1 is lower than the first tag level (that is, Level 2) corresponding to the "photograph", and the server determines the candidate account F1 as the target account.

Optionally, the server may determine the candidate account meeting the tag level specified by the user as the target account. The candidate account F2 is determined as the target account, if the first tag level of the candidate account that is specified by the first account E1 to receive the bullet screen information has the same level as the second tag level, and the second tag level (that is, Level 2) corresponding to the candidate tag information, "photographer", of the candidate account F2 has the same level as the first tag level (that is, Level 2) corresponding to the "photographer".

Optionally, the server may directly determine the candidate account as the target account. For example, the candidate accounts F1, F2, and F3 determined in step 304 are directly determined as the target accounts.

The subsequent server finally sends the bullet screen content to the client on which the determined target account logs, thus, if the first manner in step 205 is employed, the bullet screen content provided by the second account may be sent to an account having a lower tag level, so that the user corresponding to the first account may see the bullet screen content posted by the account corresponding to the user having a higher level of the same filed, which enables the user to perform the corresponding learning based on the bullet screen content. Thus, for the first account, the current bullet screen display mode is a learning mode.

By employing the second manner in step 205, the bullet screen content provided by the second account may be sent to an account having a higher tag level, so that the user corresponding to the first account may see the bullet screen content posted by the account corresponding to the user having a higher level of the same field. Thus, the bullet screen content may be a certain reference to the user corresponding to the target account, and for the first account, the current bullet screen display mode is a basic mode. By employing the third manner, the first account may receive the bullet screen content provided by the candidate account having a tag level equal to the specified tag level, wherein the specified tag level may be specified by the first account, so that only the bullet screen content meeting the requirements of the first account can be provided to the first account, and the user corresponding to the first account can flexibly set the specified tag level according to actual needs. Therefore, the flexibility of the bullet screen display is rather high.

Step 306, the bullet screen content in the bullet screen information derived from the target account is sent to the client on which the target account logs, the client on which the target account logs being configured to display the bullet screen content while displaying the target multimedia content.

The bullet screen content in the bullet screen information deriving from the target account is sent to the client on which the first account logs based on the determined target account. The example of step 301 is still taken as an example here. Supposing the target account is account F3, the server may finally send the bullet screen content in the bullet screen information deriving from the target account F3 to the client on which the first account logs to make it displayed by the client on which the first account logs during the process of watching the "Isle of Dogs".

Illustratively, supposing the client on which Xiaoming's account logs is watching "Peppa Pig", other users, Xiaohua, Xiaobai and Xiaohei, send the bullet screen contents that "i like Peppa's Mom", "Peppa's style is very pretty", and "the scenario is quite nature" when or before Xiaoming watches the "Peppa Pig". Supposing the tag information of Xiaoming's account is primary school student and anime fan, the tag information of Xiaohua's account is college student and photographer, the tag information of Xiaobai's account is comics fan and boy, and the tag information of Xiaohei's account is food complex and photographer, the server may determine Xiaobai's account as the target account based on the matching result between the tag information of the Xiaoming's account and the tag information of the other three's accounts, and further display the bullet screen content that "i like Peppa's Mom" as sent by Xiaobai when Xiaoming is watching the "Peppa Pig".

In summary, in the first bullet screen processing manner provided by embodiments of the present disclosure, the bullet screen content displayed at the client on which the first account logs may be filtered, based on the tag information of the first account, from the tag information of the plurality of second accounts that watch the same multimedia content with the first account and send the bullet screen content, so as to realize the filtering of the bullet screen content received by the client on which the first account logs. That is, for the client on which the first account logs, the senders of the bullet screen content are filtered, and the bullet screen content sent by the senders that are filtered out will not be displayed at the client on which the first account logs.

Further illustratively, if the client on which Xiaohua's account logs has watched "Calabash Brothers" and "Boonle Bears" for a long time, the server may determine the tag information of Xiaohua as children's work based on the watching behavior. If the client on which Xiaomei's account logs has watched "Avengers" and "Batman" for a long time, the server determines the tag information of Xiaomeias superhero based on the watching behavior. Supposing both Xiaohua and Xiaomei send bullet screen information as watching "Les Miserables", the bullet screen content in the bullet screen information sent by Xiaohua will not be displayed, based on the matching result between the tag information of them, during the process when Xiaomei is watching "Les Miserables". Correspondingly, the bullet screen content in the bullet screen information sent by Xiaomei will not be displayed either during the process when Xiaohua is watching "Les Miserables".

In summary, in the method for processing bullet screen according to embodiments of the present disclosure, the acquired bullet screen information may match with the tag information of the account of the user watching the target multimedia content, so as to determine, based on the matching result, the target account displaying the bullet screen content in the determined candidate account during the process of displaying the target multimedia content, and then filter out the bullet screen information including the bullet screen content that is not required to display from the acquired bullet screen information, thereby improving the flexibility in processing the bullet screen information. Furthermore, the server may filter the target account from the candidate account by the keyword extracted from the bullet screen content, or filter the target account from the candidate account by the tag level, so as to make the process of processing the bullet screen information more pertinent and personalized.

Figure 5:
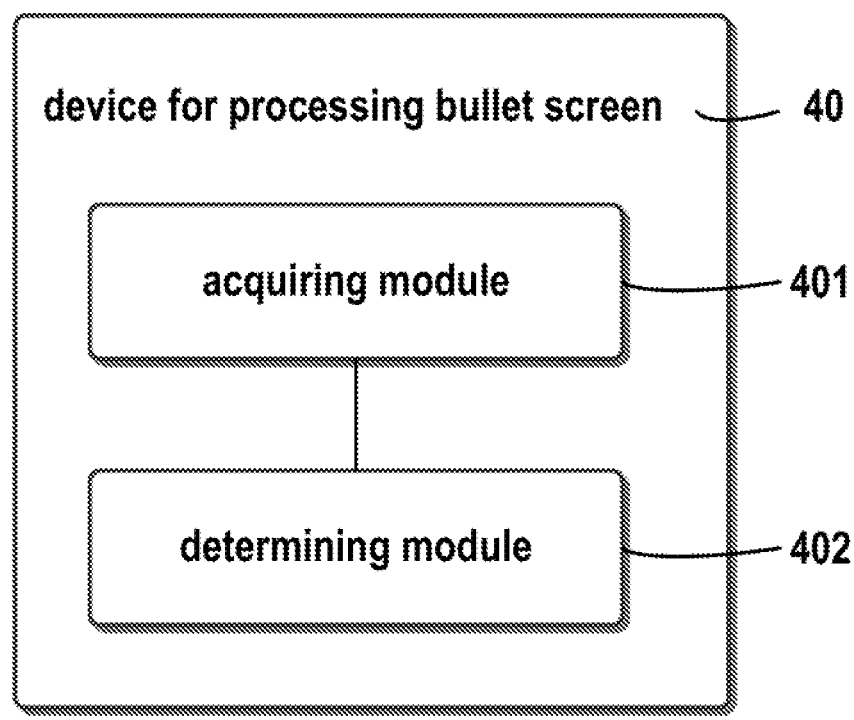
FIG. 5 is a schematic diagram of a structure of a device for processing bullet screen according to an exemplary embodiment.

An embodiment of the present disclosure provides a device for processing bullet screen 40, and as shown in FIG. 5, the device includes following modules:

an acquiring module 401, configured to acquire bullet screen information and tag information of an account of a user watching the target multimedia content, wherein the bullet screen information includes a bullet screen content, the bullet screen information is the information sent for the target multimedia content, and the tag information is used to identify a type of the account; and a determining module 402, configured to determine whether to display the bullet screen content in the bullet screen information while displaying the target multimedia content based on a matching result between the tag information and the bullet screen information.

Optionally, the acquiring module 401 is configured to:

receive the bullet screen information sent by the client on which the first account logs, the first account being an account of a user currently watching the target multimedia content;

determine the first tag information of the first account; and acquire the second tag information of a second account of the user (such as all the users) currently watching the target multimedia content.

The determining module 402 is configured to:

filter a target account from the second account, the second tag information of the target account matching with the first tag information; and send the bullet screen content in the bullet screen information to the client on which the target account logs, the client on which the target account logs being configured to display the bullet screen content while displaying the target multimedia content.

Optionally, the acquiring module 401 is configured to:

acquire the bullet screen information posted for the target multimedia content; and determine the first tag information of the first account, the first account being an account of a user currently watching the target multimedia content.

The determining module 402 is configured to:

acquire the second tag information of the second account from which each piece of the bullet screen information is derived;

filter a target account from the second account, the second tag information of the target account matching with the first tag information; and send the bullet screen content in the bullet screen information derived from the target account to the client on which the target account logs, the client on which the target account logs being used to display the bullet screen content while displaying the target multimedia content.

Optionally, the determining module 402 is configured to:

determine, in the second tag information of the second account, candidate tag information matching with the first tag information; and filter the target account from the candidate account, the candidate account being an account to which the candidate tag information belongs.

Optionally, the determining module 402 is configured to:

extract keywords of the bullet screen content in the acquired bullet screen information;

determine the related multimedia content of the target multimedia content, wherein the related multimedia content is the multimedia content related to at least one of attributes and keywords of the target multimedia content;

determine the candidate multimedia content related to the extracted keywords in the related multimedia content;

determine the third tag information corresponding to the candidate multimedia content; and determine the tag information matching with the third tag information in the tag information of the candidate account, and then determine the candidate account to which the matched tag information belongs as the target account.

Optionally, the determining module 402 is configured to:

determine the second tag level of the candidate account to which the candidate tag information belongs;

filter the target account from the candidate account based on the second tag level, the target account meets any one of the following conditions:

the second tag level of the target account is higher than the first tag level;

the second tag level of the target account is lower than the first tag level; and the second tag level of the target account is equal to the specified tag level;

wherein the first tag level is a tag level of the first tag information of the first account.

That is, the candidate account having a second tag level higher than the first tag level is correspondingly determined as the target account.

Or, the candidate account having a second tag level lower than the first tag level is correspondingly determined as the target account.

Or, the candidate account having a second tag level equal to the specified tag level is correspondingly determined as the target account.

Optionally, the acquiring module 401 is configured to:

carry the first tag information in each piece of the bullet screen information posted by the first account, and extract the first tag information from any piece of the bullet screen information posted by the first account;

or, query correspondence between the account and the tag information based on the first account to acquire the first tag information of the first account;

or, acquire historical behaviors corresponding to the first account, and determine the first tag information based on the historical behaviors;

or, acquire the user attribute information corresponding to the first account, and determine the first tag information based on the user attribute information.

Optionally, the multimedia content may be a picture, an audio or a video, and the bullet screen information further includes an account and a content related to the account.

In summary, in the device for processing bullet screen according to embodiments of the present disclosure, the acquiring module may match the acquired bullet screen information with the tag information of the account of the user watching the target multimedia content; the determining module may determine, based on the matching result, whether to display the bullet screen content in the bullet screen information during the process of displaying the target multimedia content, and then filter out the bullet screen information including the bullet screen content that is not required to display from the acquired bullet screen information, thereby improving the flexibility in processing the bullet screen information.

Figure 6:
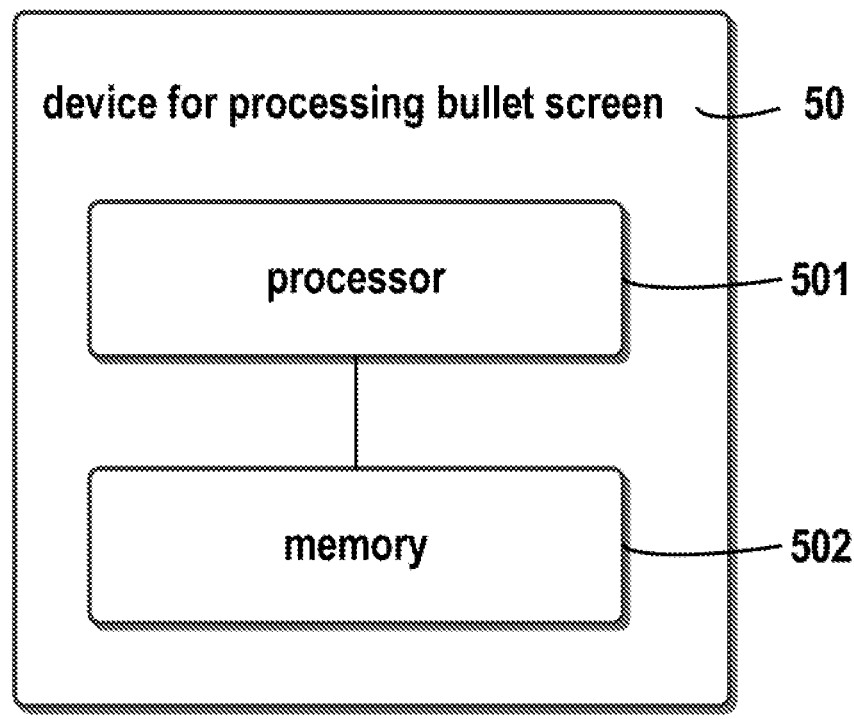
FIG. 6 is a schematic diagram of a structure of a device f for processing bullet screen according to another exemplary embodiment.

An embodiment of the present disclosure provides a device for processing bullet screen 50, and as shown in FIG. 6, the device 50 includes following components:

a processor 501;

a memory 502 for storing a processor-executable instruction, wherein the processor is configured to execute any one of the methods for processing bullet screen according to above embodiments.

Figure 7:
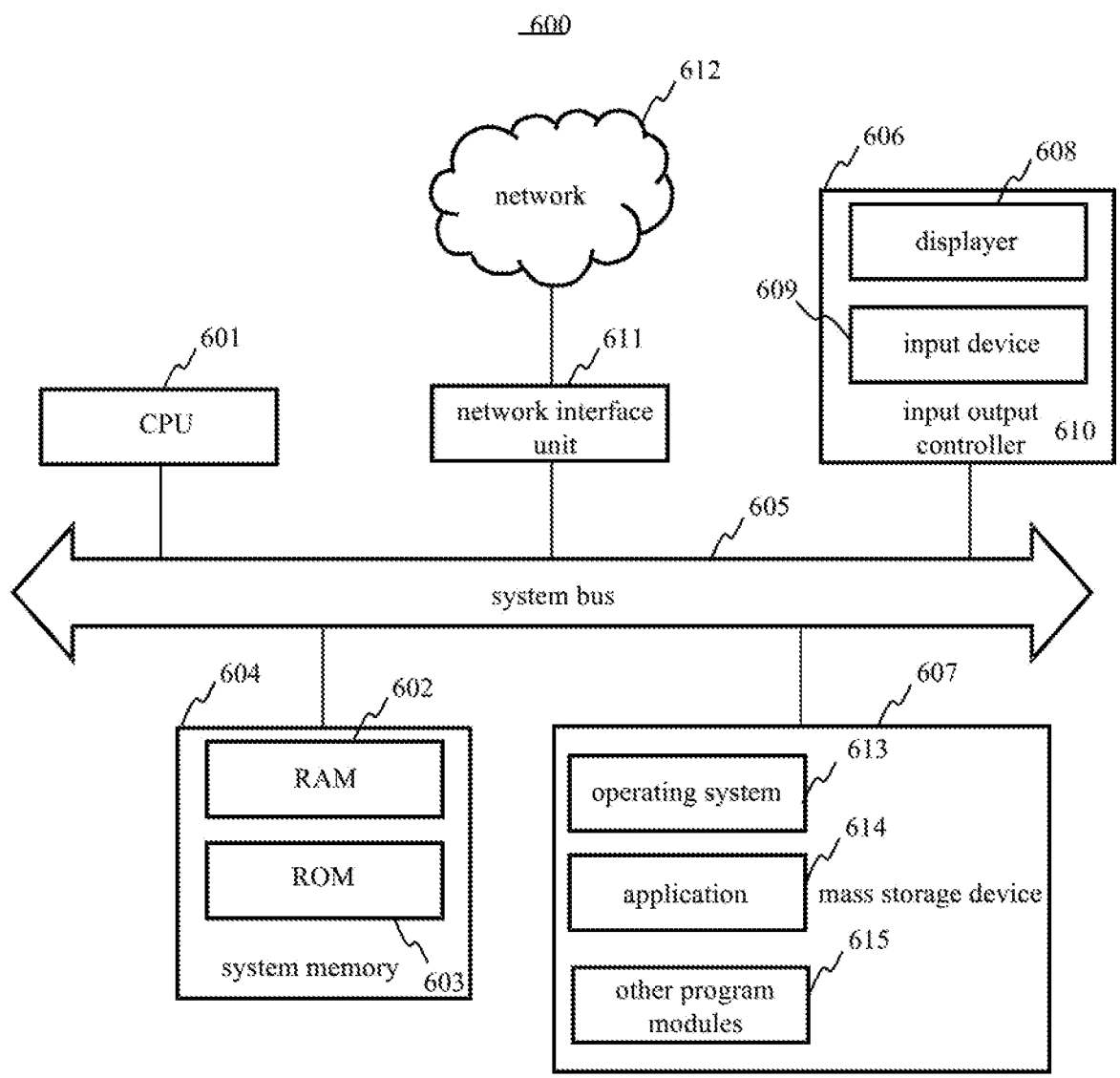
FIG. 7 is a schematic diagram of a structure of a device for processing bullet screen according to yet another exemplary embodiment.

FIG. 7 is a schematic diagram of a structure of a server according to an exemplary embodiment. The server 600 includes a central processing unit (CPU) 601, a system memory 604 including a random access memory (RAM) 602 and a read only memory (ROM) 603, and a system bus 605 that connects the system memory 604 and the central processing unit 601. The server 600 further includes a basic input/output system (I/O system) 606 that facilitates to transfer the information between respective devices within the computer, and a mass storage device 607 for storing an operating system 613, an application 614, and other program modules 615.

The basic input/output system 606 includes a displayer 608 for displaying the information and an input device 609, such as a mouse or keyboard, for the user to input information. The displayer 608 and the input device 609 are both connected to the CPU 601 via an input output controller 610 that is connected to the system bus 605. The basic I/O system 606 may further include an input output controller 610 for receiving and processing the input from a plurality of other devices, such as a keyboard, mouse, or electronic stylus.

Similarly, the input and output controller 610 further provides output to a display screen, a printer, or other types of output devices.

The mass storage device 607 is connected to the CPU 601 by a mass storage controller (not shown) connected to the system bus 605. The mass storage device 607 and the related computer readable mediums provide non-volatile storage for the server 600. That is, the mass storage device 607 may include a computer readable medium (not shown), such as, a hard disk or a CD-ROM drive.

Without loss of generality, the computer-readable medium may include a computer storage medium and a communication medium. The computer storage medium includes volatile and nonvolatile, removable and non-removable mediums implemented by any method or technology for storing the information, such as, computer readable instructions, data structures, program modules or other data. The computer storage medium includes RAM, ROM, EPROM, EEPROM, flash memory or other solid state storage technologies, CD-ROM, DVD or other optical storage, tape cartridges, magnetic tape, magnetic disk storage or other magnetic storage devices. Of course, a person skilled in the art will appreciate that the computer storage medium is not limited to the above ones. The aforesaid system memory 604 and mass storage device 607 may be collectively referred to as a memory.

According to various embodiments of the present disclosure, the server 600 may further be operated by a remote computer connected to the network through the network such as the Internet. That is, the server 600 may be connected to the network 612 through a network interface unit 611 connected to the system bus 605, or may be connected to other types of networks or remote computer systems (not shown) through the network interface unit 611.

The memory further includes one or more programs, wherein the one or more programs are stored in the memory, and the CPU 601 implements the method for processing bullet screen shown in FIG. 2 to FIG. 4 by executing the one or more programs.

In an exemplary embodiment, a non-transitory computer readable storage medium that includes instructions is provided, such as, a memory including the instructions. The instructions are executed by a processor of the server to perform the method for processing bullet screen shown in respective embodiments of the present application. For example, the non-transitory computer readable storage medium may be a ROM, a random access memory (RAM), a CD-ROM, a magnetic tape, a floppy disk, an optical data storage device or the like.

With regard to the device in the aforesaid embodiments, the specific manner in which the respective modules perform the operations has been described in detail in embodiments of the method, and will not be explained in detail herein.

Embodiments of the present disclosure provide a system for processing bullet screen. The system includes a bullet screen managing server 730, and the bullet screen managing server includes any one of the aforesaid bullet screen display devices. The bullet screen managing server may be the server 120 shown in FIG. 1 described above.

Figure 8:
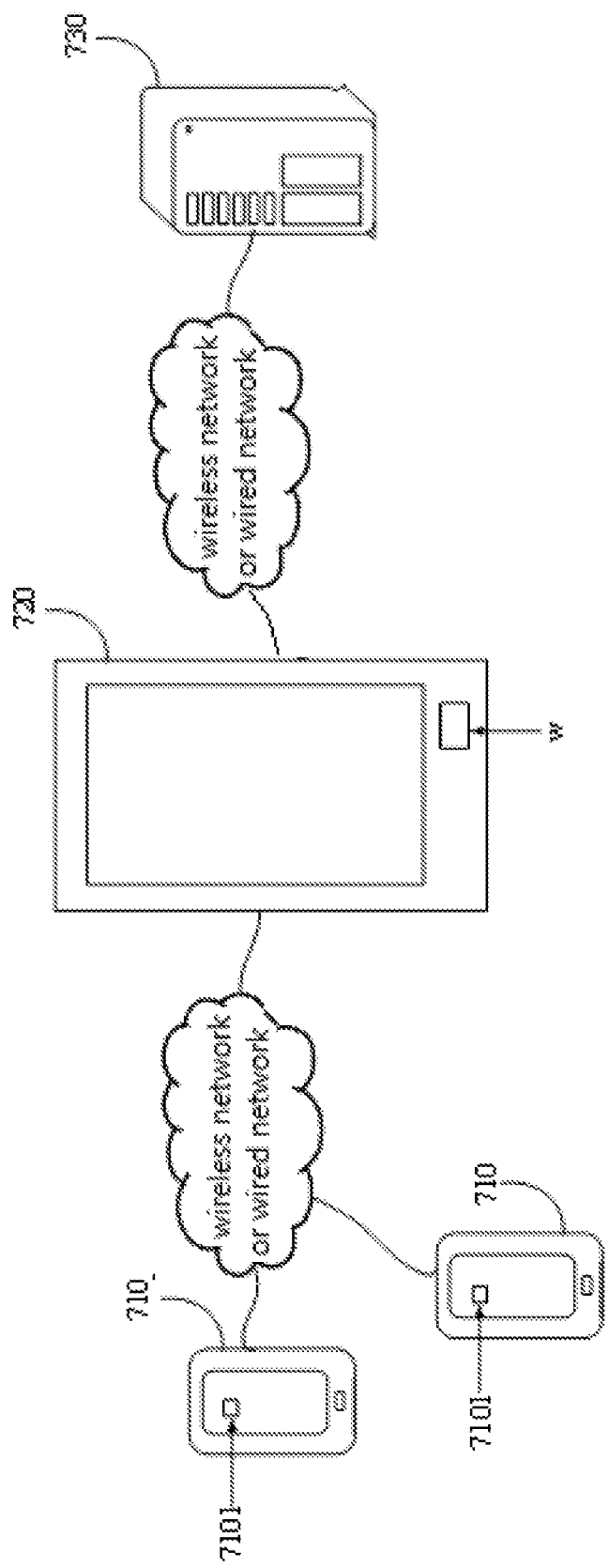
FIG. 8 is a schematic diagram of an environment of another method for processing bullet screen according to an exemplary embodiment.

Furthermore, as shown in FIG. 8, the server may include:

a work display device 720 and at least two terminals 710, wherein each of the at least two terminals 710 is installed with a work display client 7101 that may include a work display client installed in the first terminal or the second terminal in the system shown in FIG. 1, and each terminal may be a mobile terminal.

In the system, the terminal 710 may be connected to the work display device 720, and the work display device 720 may be connected to the bullet screen managing server 730 through a wired network or a wireless network. The terminal 710 may be a smart phone, a computer, a multimedia player, an e-reader, and the like, capable of sending the bullet screen information. The work display device 720 may be an electronic display screen or an electronic frame. The bullet screen managing server 730 may be a server, a cluster of servers consisting of a plurality of servers, or a cloud computing service center.

The work display device 720 is configured to display the multimedia content, and the work display device is provided with the identification information W. The work display client 7101 is configured to acquire the identification information W, and acquire the multimedia content displayed by the work display device based on the identification information W. The multimedia content and the bullet screen content for the multimedia content are displayed on the terminal 710.

In summary, in the system for processing bullet screen according to embodiments of the present disclosure, the acquired bullet screen information may match with the tag information of the account of the user watching the target multimedia content, so as to determine, based on the matching result, whether to display the bullet screen content in the bullet screen information during the process of displaying the target multimedia content, and then filter out the bullet screen information including the bullet screen content that is not required to display from the acquired bullet screen information, thereby improving the flexibility in processing the bullet screen information.

Furthermore, in the system for processing bullet screen, the bullet screen content may be prevented from being directly displayed on the work display device, so as to prevent occluding the multimedia content displayed on the work display device, and enhance the viewer's viewing experience. Meanwhile, the user may send a bullet screen for the multimedia content on the terminal based on the multimedia content displayed on the work display device as acquired in the terminal, thereby satisfying the user's demand on making comments to the multimedia content. Furthermore, the bullet screen managing server may employ the aforesaid method for processing bullet screen to filter the bullet screen content displayed when different users watch the multimedia content at the terminal, thereby improving the pertinence and flexibility of the bullet screen information processing.

Figure 9:
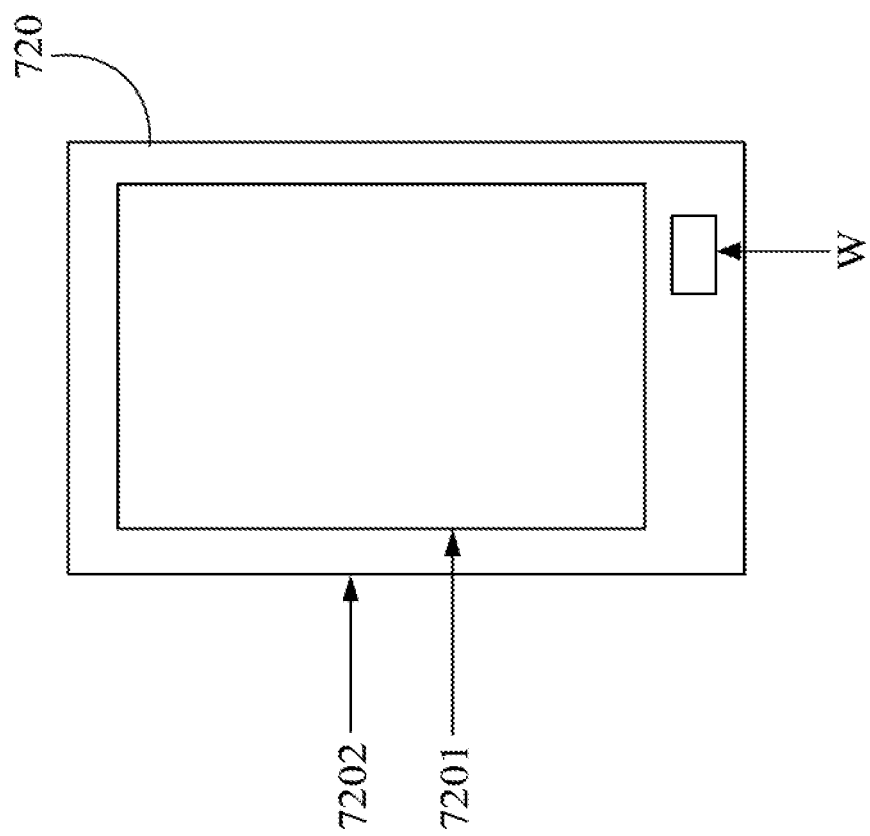
FIG. 9 is a schematic diagram of a structure of a device for bullet screen displaying according to an exemplary embodiment.

Furthermore, as shown in FIG. 9, the work display device 720 includes a primary display area 7271 and a secondary display area 7202. The primary display area is used to display the multimedia content, and the secondary display area is used to display the identification information.

Optionally, further referring to FIG. 9, the work display device is an electronic frame, wherein the primary display area 7201 is an area enclosed by the frame body of the electronic frame, and the secondary display area 7202 is an area on the frame body of the electronic frame.

There are three manners to display the identification information in the area on the frame body of the electronic frame.

Figure 10:
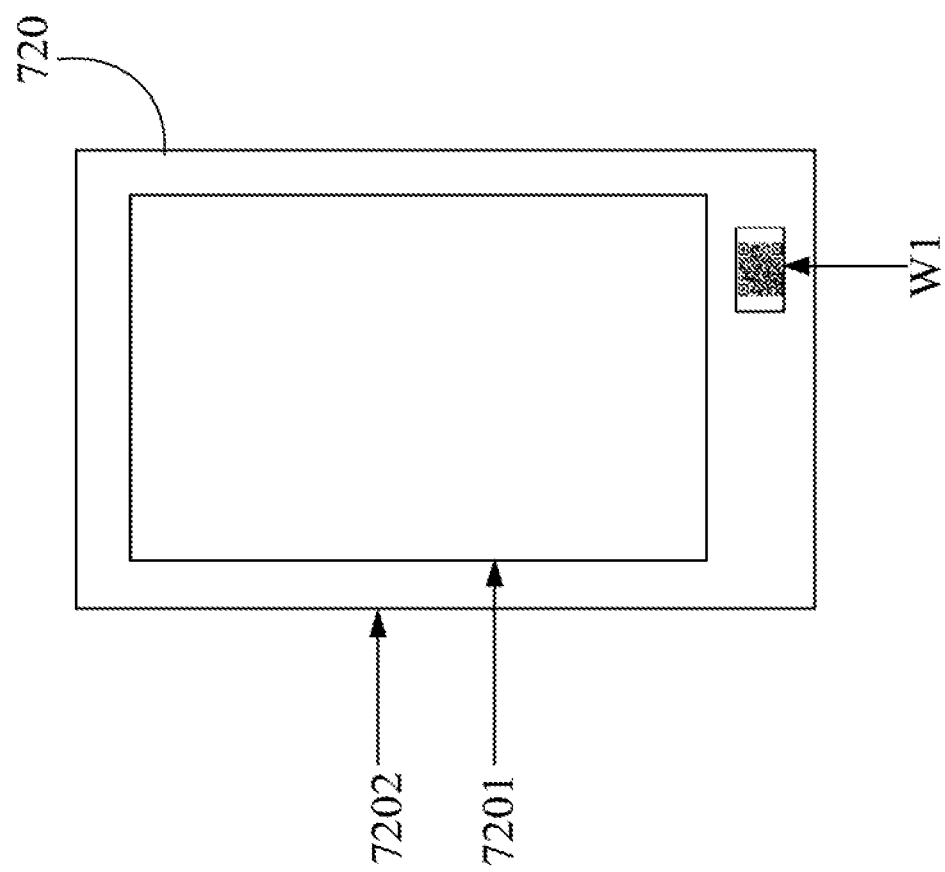
FIG. 10 is a schematic diagram of a structure of another device for bullet screen displaying according to an exemplary embodiment.

In the first manner, a display screen is provided on the frame body, and the secondary display area is the area where the display screen is located. Optionally, as shown in FIG. 10, the identification information W1 displayed in the secondary display area may be displayed in the form of a two-dimensional code, and different two-dimensional codes correspond to different multimedia contents. The user triggers the camera to scan the two-dimensional code with the work display client installed by the terminal, obtains the multimedia content displayed by the work display device, and then displays on the work display client of the terminal.

In the second manner, the frame body has an opening in which an array of light emitting diodes (LEDs) is embedded. The secondary display area is an area where the array of LEDs is located.

In the third manner, the frame body is made of a light transmissive material and provided with a cavity in which the array of LEDs is provided. The secondary display area is an area where the array of LEDs is located.

Figure 11:
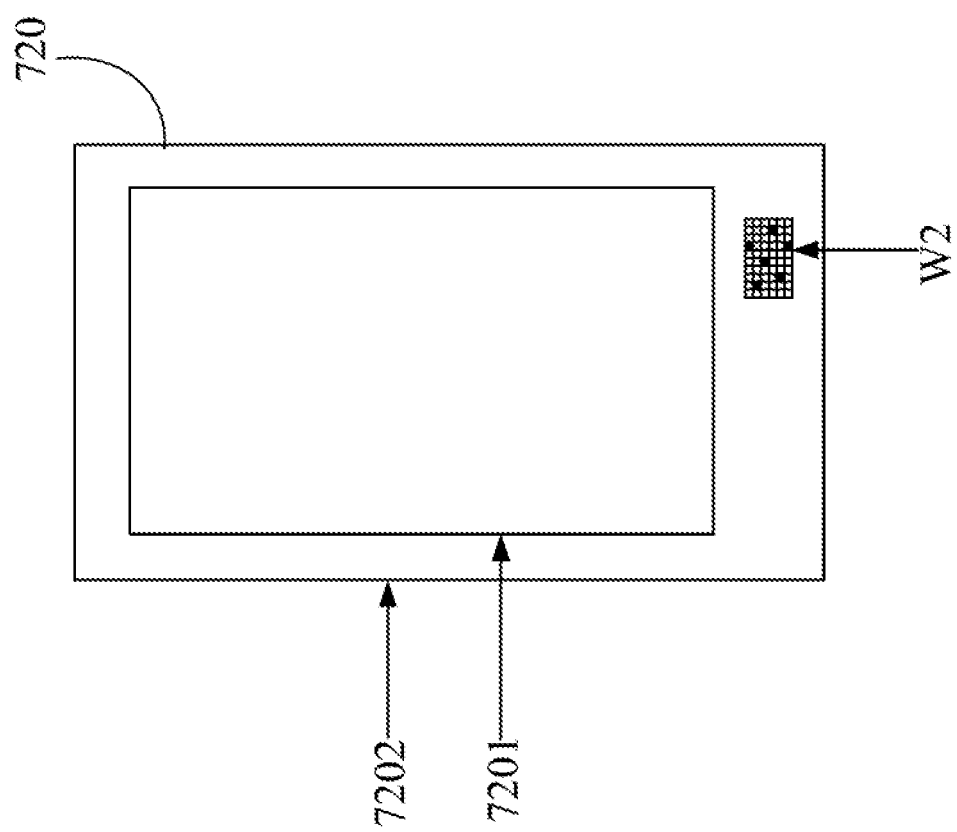
FIG. 11 is a schematic diagram of a structure of yet another device for bullet screen displaying according to an exemplary embodiment.

In the aforesaid second manner and third manner, as shown in FIG. 11, the identification information W2 displayed in the secondary display area is the optical information emitted by the array of LEDs within a specified time period. The optical information emitted by the array of LEDs may be fixed optical information or dynamically changing information.

The user may collect the optical information emitted by the array of LEDs with the work display client installed in the terminal (for example, the optical information emitted by the array of LEDs may be captured by turning on the camera of the client). The multimedia content displayed by the work display device may be acquired through the optical information and then displayed at the work display client. Compared with the fixed optical information, the dynamically changing information may carry more information, so that the work display client can quickly obtain the multimedia content.

Illustratively, supposing the terminal is a mobile phone, users Xiao Wang and Xiao Zhang are watching the paintings of Van Gogh displayed on the electronic frame in the gallery, when they want to discuss about the painting, they can trigger the camera through the work display client on the mobile phone to scan the two-dimensional code on the frame body, and obtain the data of the painting through the two-dimensional code, and display the painting on the work display client of the mobile phone. Meanwhile, they can discuss about the painting by sending the bullet screen information, and the bullet screen managing server determines, based on their tag information, whether to display the bullet screen content in the bullet screen information sent by them on the other party's mobile phone.

In summary, in the system for processing bullet screen according to embodiments of the present disclosure, the acquired bullet screen information may match with the tag information of the account of the user watching the target multimedia content, so as to determine, based on the matching result, whether to display the bullet screen content in the bullet screen information during the process of displaying the target multimedia content, and then filter out the bullet screen information including the bullet screen content that is not required to display from the acquired bullet screen information, thereby improving the flexibility in processing the bullet screen information. In addition, in the system for processing bullet screen, the bullet screen content may be prevented from being directly displayed on the work display device, so as to prevent occluding the multimedia content displayed on the work display device, and enhance the viewer's viewing experience. Meanwhile, based on different types of identification information in the work display device, the user may flexibly acquire the multimedia content displayed on the work display device through the terminal, and send a bullet screen for the multimedia content on the terminal, thereby satisfying the user's demand on making comments to the multimedia content. Furthermore, the bullet screen managing server may employ the aforesaid method for processing bullet screen to filter the bullet screen content displayed when different users watching the multimedia content on the terminal, thereby improving the pertinence and flexibility of the bullet screen information processing.

In embodiments of the present disclosure, the terms such as "first" and "second" are merely for a descriptive purpose, and cannot be understood as indicating or implying a relative importance. The term "a plurality of" means two or more in number, unless otherwise defined.

The term "and/or" in embodiments of the present disclosure merely describes the association relationship between the associated objects and indicates that there may be three relationships; for example, A and/or B may indicate three cases where only A exists, A and B exist at the same time, and only B exists. The character "/" in the present disclosure generally indicates that the relationship between the former and later associated objects is optional.

The term "at least one of A and B" in the present disclosure merely describes the association relationship between the associated objects and indicates that there may be three relationships; for example, at least one of A and B may indicate three cases where only A exists, A and B exist at the same time, or only B exists. Similarly, "at least one of A, B and C" indicates that there may be seven relationships and may indicate seven cases where only A exists, only B exists, only C exits, A and B exist at the same time, A and C exist at the same time, C and B exist at the same time, or A, B and C exit at the same time, Similarly, "at least one of A, B, C and D" indicates that there may be fifteen relationships and may indicate fifteen cases where only A exists, only B exists, only C exits, only D exists, A and B exist at the same time, A and C exist at the same time, A and D exist at the same time, C and B exist at the same time, D and B exist at the same time, C and D exist at the same time, A, B and C exit at the same time, A, B and D exist at the same time, A, C and D exist at the same time, B, C and D exist at the same time, or A, B, C and D exist at the same time.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for processing bullet screen, comprising:
   acquiring bullet screen information and tag information of an account of a user watching a target multimedia content, the bullet screen information including a bullet screen content, and the tag information being configured to identify a type of the account; and
   determining, based on a matching result between the tag information and the bullet screen information, whether to display the bullet screen content in the bullet screen information while displaying the target multimedia content,
   wherein
      acquiring the bullet screen information and the tag information of the account of the user watching the target multimedia content comprises:
         receiving the bullet screen information sent by a client which a first account logs in, the first account being an account of a user currently watching the target multimedia content;
         determining first tag information of the first account; and
         acquiring second tag information of a second account of the user currently watching the target multimedia content, and
      determining, based on the matching result between the tag information and the bullet screen information, whether to display the bullet screen content in the bullet screen information during the process of displaying the target multimedia content comprises:
         filtering a target account from the second account, the second tag information of the target account matching with the first tag information; and
         sending the bullet screen content in the bullet screen information to the client which the target account logs in, the client which the target account logs in being configured to display the bullet screen content while displaying the target multimedia content,
   or wherein,
      acquiring the bullet screen information and the tag information of the account of the user watching the target multimedia content comprises:
         acquiring the bullet screen information posted for the target multimedia content; and
         determining the first tag information of the first account, the first account being the account of the user currently watching the target multimedia content, and
      determining, based on the matching result between the tag information and the bullet screen information, whether to display the bullet screen content in the bullet screen information while displaying the target multimedia content comprises:
         acquiring second tag information of the second account from which each piece of the bullet screen information is derived;
         filtering a target account from the second account, the second tag information of the target account matching with the first tag information; and
         sending the bullet screen content in the bullet screen information derived from the target account to the client which the first account logs in, the client which the first account logs in being configured to display the bullet screen content while displaying the target multimedia content.

2. The method according to claim 1, wherein
   acquiring the bullet screen information and the tag information of the account of the user watching the target multimedia content comprises:
      receiving the bullet screen information sent by a client which a first account logs in, the first account being an account of a user currently watching the target multimedia content;
   determining first tag information of the first account; and
   acquiring second tag information of a second account of the user currently watching the target multimedia content, p1 wherein determining, based on the matching result between the tag information and the bullet screen information, whether to display the bullet screen content in the bullet screen information during the process of displaying the target multimedia content comprises:
   filtering a target account from the second account, the second tag information of the target account matching with the first tag information; and
   sending the bullet screen content in the bullet screen information to the client which the target account logs in, the client which the target account logs in being configured to display the bullet screen content while displaying the target multimedia content, and
   wherein filtering the target account from the second account comprises:
   determining, in the second tag information of the second account, candidate tag information matching with the first tag information; and filtering the target account from a candidate account, the candidate account being an account to which the candidate tag information belongs.

3. The method according to claim 2, wherein filtering the target account from the candidate account comprises any one of:

extracting keywords from the bullet screen content in the acquired bullet screen information; determining a related multimedia content of the target multimedia content, the related multimedia content being a multimedia content related to at least one of attributes and keywords of the target multimedia content; determining, in the related multimedia content, a candidate multimedia content related to the extracted keywords; determining third tag information corresponding to the candidate multimedia content; determining, in the tag information of the candidate account, the tag information matching with the third tag information; and determining the candidate account to which the matched tag information belongs as the target account;

determining a second tag level of the candidate tag information of the candidate account to which the candidate tag information belongs; filtering the target account from the candidate account based on a first tag level and the second tag level; wherein the target account satisfies any one of the followings: the second tag level of the target account is higher than the first tag level; the second tag level of the target account is lower than the first tag level; the second tag level of the target account is equal to a specified tag level, the first tag level being a tag level of the first tag information of the first account.

4. The method according to claim 1, wherein determining the first tag information of the first account comprises any one of:

carrying the first tag information in each piece of the bullet screen information posted by the first account, and extracting the first tag information from any piece of the bullet screen information posted by the first account;

querying correspondence between the account and the tag information based on the first account, and acquiring the first tag information of the first account;

acquiring historical behaviors corresponding to the first account, and determining the first tag information based on the historical behaviors; and acquiring user attribute information corresponding to the first account, and determining the first tag information based on the user attribute information.

5. The method according to claim 1, wherein acquiring the bullet screen information and the tag information of the account of the user watching the target multimedia content comprises:

acquiring the bullet screen information posted for the target multimedia content; and determining the first tag information of the first account, the first account being the account of the user currently watching the target multimedia content, wherein determining, based on the matching result between the tag information and the bullet screen information, whether to display the bullet screen content in the bullet screen information while displaying the target multimedia content comprises:

acquiring second tag information of the second account from which each piece of the bullet screen information is derived;

filtering a target account from the second account, the second tag information of the target account matching with the first tag information; and sending the bullet screen content in the bullet screen information derived from the target account to the client which the first account logs in, the client which the first account logs in being configured to display the bullet screen content while displaying the target multimedia content, and wherein filtering the target account from the second account comprises:

determining, in the second tag information of the second account, candidate tag information matching with the first tag information; and filtering the target account from the candidate account, the candidate account being an account to which the candidate tag information belongs.

6. The method according to claim 5, wherein filtering the target account from the candidate account comprises any one of:

extracting keywords from the bullet screen content in the acquired bullet screen information; determining a related multimedia content of the target multimedia content, the related multimedia content being a multimedia content related to at least one of attributes and keywords of the target multimedia content; determining, in the related multimedia content, a candidate multimedia content related to the extracted keywords; determining third tag information corresponding to the candidate multimedia content; determining, in the tag information of the candidate account, the tag information matching with the third tag information; and determining the candidate account to which the matched tag information belongs as the target account; and determining a second tag level of the candidate tag information of the candidate account to which the candidate tag information belongs; filtering the target account from the candidate account based on the second tag level; wherein the target account satisfies any one of the followings: the second tag level of the target account is higher than the first tag level; the second tag level of the target account is lower than the first tag level; and the second tag level of the target account is equal to a specified tag level, the first tag level being a tag level of the first tag information of the first account.

7. The method according to claim 1, wherein determining the first tag information of the first account comprises any one of:

carrying the first tag information in each piece of the bullet screen information posted by the first account, and extracting the first tag information from any piece of the bullet screen information posted by the first account;

querying correspondence between the account and the tag information based on the first account, and acquiring the first tag information of the first account;

acquiring historical behaviors corresponding to the first account, and determining the first tag information based on the historical behaviors; and acquiring user attribute information corresponding to the first account, and determining the first tag information based on the user attribute information.

8. The method according to claim 6, wherein the process of determining the first tag information of the first account comprises any one of:

carrying the first tag information in each piece of the bullet screen information posted by the first account, and extracting the first tag information from any piece of the bullet screen information posted by the first account;

querying correspondence between the account and the tag information based on the first account, and acquiring the first tag information of the first account;

acquiring historical behaviors corresponding to the first account, and determining the first tag information based on the historical behaviors; and acquiring user attribute information corresponding to the first account, and determining the first tag information based on the user attribute information; wherein the multimedia content is one of a picture, an audio and a video, and the bullet screen information further includes an account and a content related to the account.

9. A device for processing bullet screen, comprising:
a processor;
a memory for storing a processor-executable instruction, wherein
the processor is configured to execute a method for processing bullet screen, and the method for processing bullet screen comprises:
acquiring bullet screen information and tag information of an account of a user watching a target multimedia content, the bullet screen information including a bullet screen content, and the tag information being configured to identify a type of the account; and
determining, based on a matching result between the tag information and the bullet screen information, whether to display the bullet screen content in the bullet screen information while displaying the target multimedia content,
wherein
acquiring the bullet screen information and the tag information of the account of the user watching the target multimedia content comprises:
receiving the bullet screen information sent by a client which a first account logs in the first account being an account of a user currently watching the target multimedia content;
determining first tag information of the first account; and
acquiring second tag information of a second account of the user currently watching the target multimedia content, and
determining, based on the matching result between the tag information and the bullet screen information, whether to display the bullet screen content in the bullet screen information during the process of displaying the target multimedia content comprises:
filtering a target account from the second account, the second tag information of the target account matching with the first tag information; and
sending the bullet screen content in the bullet screen information to the client which the target account logs in, the client which the target account logs in being configured to display the bullet screen content while displaying the target multimedia content,
or wherein,
acquiring the bullet screen information and the tag information of the account of the user watching the target multimedia content comprises:
acquiring the bullet screen information posted for the target multimedia content; and
determining the first tag information of the first account, the first account being the account of the user currently watching the target multimedia content, and
determining, based on the matching result between the tag information and the bullet screen information, whether to display the bullet screen content in the bullet screen information while displaying the target multimedia content comprises:
acquiring second tag information of the second account from which each piece of the bullet screen information is derived;
filtering a target account from the second account, the second tag information of the target account matching with the first tag information; and
sending the bullet screen content in the bullet screen information derived from the target account to the client which the first account logs in, the client which the first account logs in being configured to display the bullet screen content while displaying the target multimedia content.

10. A non-transitory computer-readable storage medium, in which an instruction in stored, wherein when the non-transitory computer-readable storage medium runs at a processing component, the processing component is actuated to execute a method for processing bullet screen, and the method comprises:
acquiring bullet screen information and tag information of an account of a user watching a target multimedia content, the bullet screen information including a bullet screen content, and the tag information being configured to identify a type of the account; and
determining, based on a matching result between the tag information and the bullet screen information, whether to display the bullet screen content in the bullet screen information while displaying the target multimedia content,
wherein
acquiring the bullet screen information and the tag information of the account of the user watching the target multimedia content comprises:
receiving the bullet screen information sent by a client which a first account logs in , the first account being an account of a user currently watching the target multimedia content;
determining first tag information of the first account; and
acquiring second tag information of a second account of the user currently watching the target multimedia content, and
determining, based on the matching result between the tag information and the bullet screen information, whether to display the bullet screen content in the bullet screen information during the process of displaying the target multimedia content comprises:
filtering a target account from the second account, the second tag information of the target account matching with the first tag information; and
sending the bullet screen content in the bullet screen information to the client which the target account logs in, the client which the target account logs in being configured to display the bullet screen content while displaying the target multimedia content,
or wherein, acquiring the bullet screen information and the tag information of the account of the user watching the target multimedia content comprises:

acquiring the bullet screen information posted for the target multimedia content; and determining the first tag information of the first account, the first account being the account of the user currently watching the target multimedia content, and determining, based on the matching result between the tag information and the bullet screen information, whether to display the bullet screen content in the bullet screen information while displaying the target multimedia content comprises:

acquiring second tag information of the second account from which each piece of the bullet screen information is derived;

filtering a target account from the second account, the second tag information of the target account matching with the first tag information; and sending the bullet screen content in the bullet screen information derived from the target account to the client which the first account logs in, the client which the first account logs in being configured to display the bullet screen content while displaying the target multimedia content.

11. A system for processing bullet screen, comprising a bullet screen managing server that comprises the device for processing bullet screen as defined in claim 9.

12. The system according to claim 11, wherein the system further comprises:

a work display device and at least two terminals, wherein each of the at least two terminals is installed with a work display client;

the work display device is configured to display the multimedia content and is provided with identification information; and the work display client is configured to acquire the identification information, acquire the multimedia content displayed by the work display device based on the identification information, display the multimedia content, and display the bullet screen content for the multimedia content.

13. The system according to claim 12, wherein the work display device comprises a primary display area and a secondary display area, wherein the primary display area is configured to display the multimedia content, and the secondary display area is configured to display the identification information.

14. The system according to claim 13, wherein the work display device is an electronic frame, the primary display area being an area enclosed by a frame body of the electronic frame, and the secondary display area being an area on the frame body of the electronic frame.

15. The system according to claim 14, wherein the frame body is provided with a display screen, and the secondary display area is an area where the display screen is located.

16. The system according to claim 15, wherein the frame body satisfies any one of the followings:

the frame body is provided with an opening in which an array of light emitting diodes (LEDs) is embedded, the secondary display area being an area where the array of LEDs is located; and the frame body is made of a light transmissive material and provided with a cavity in which the array of LEDs is provided, the secondary display area being an area where the array of LEDs is located.

17. The system according to claim 16, wherein optical information emitted by the array of LEDs is dynamically changing information, and the identification information is the optical information emitted by the array of LEDs within a specified time period.

18. The system according to claim 12, wherein the identification information is displayed in a form of a two-dimensional code.

\* \* \* \* \*